Nov. 29, 1960 J. T. BOWEN ET AL 2,961,783
CONTROL SYSTEM FOR A VEHICLE-MOUNTED TOOL
Filed Jan. 16, 1957 9 Sheets-Sheet 1
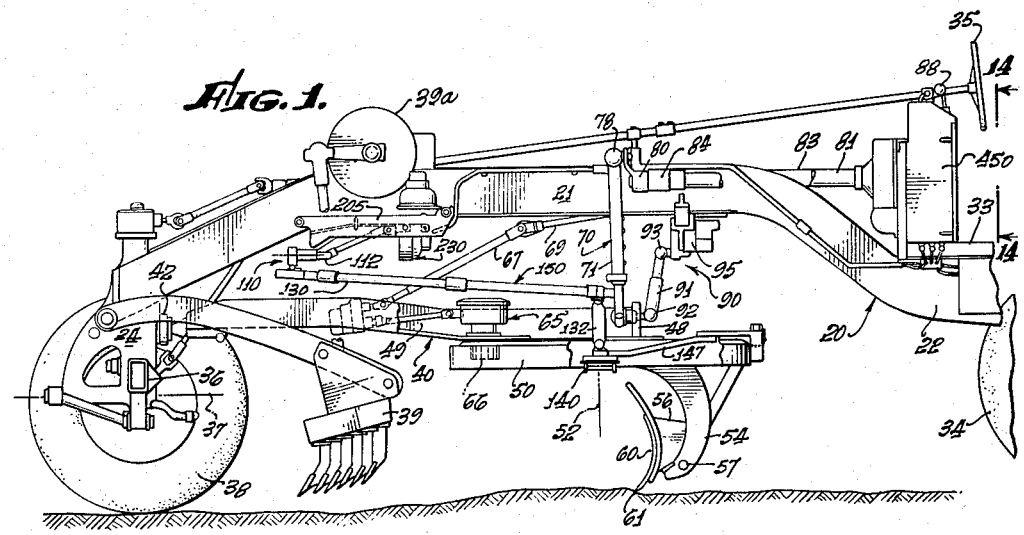
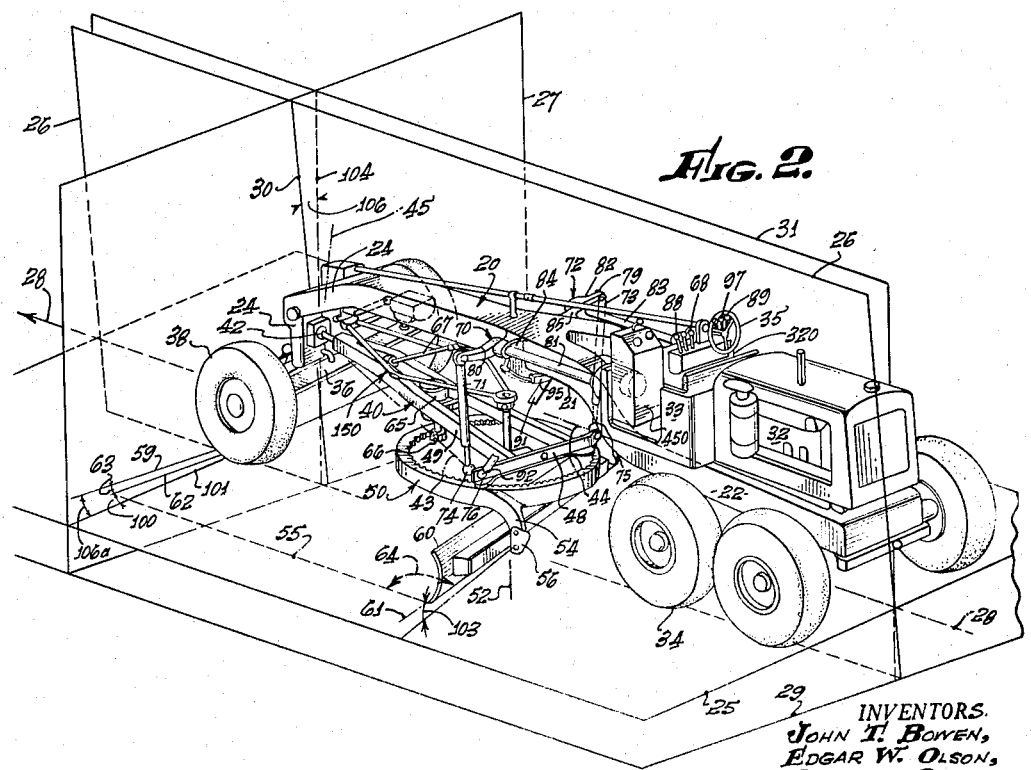
INVENTORS.
JOHN T. BOWEN,
EDGAR W. OLSON,
PAUL K. BEEMER,
REEFORD P. SHEA
By Bartelew + Lewis

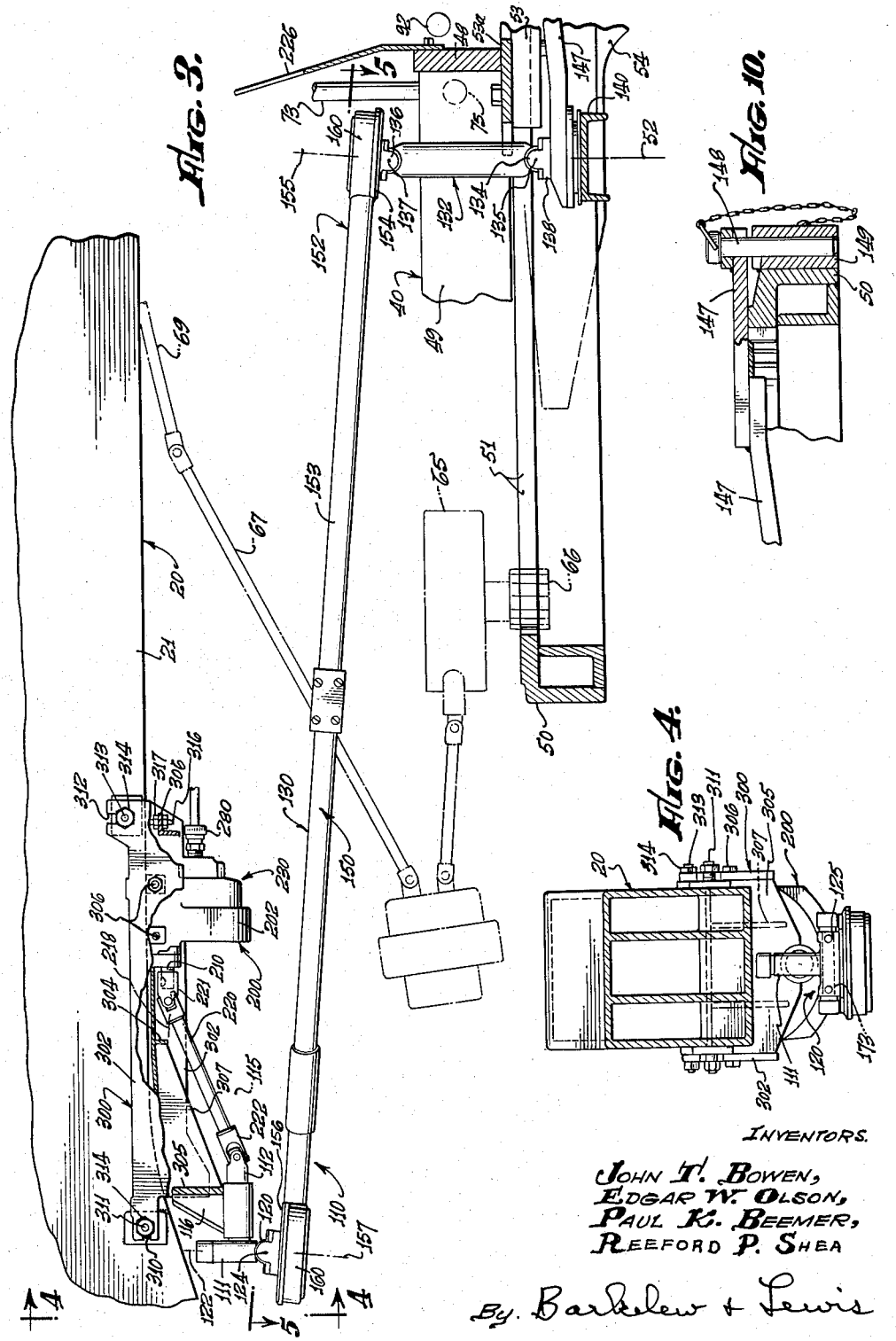

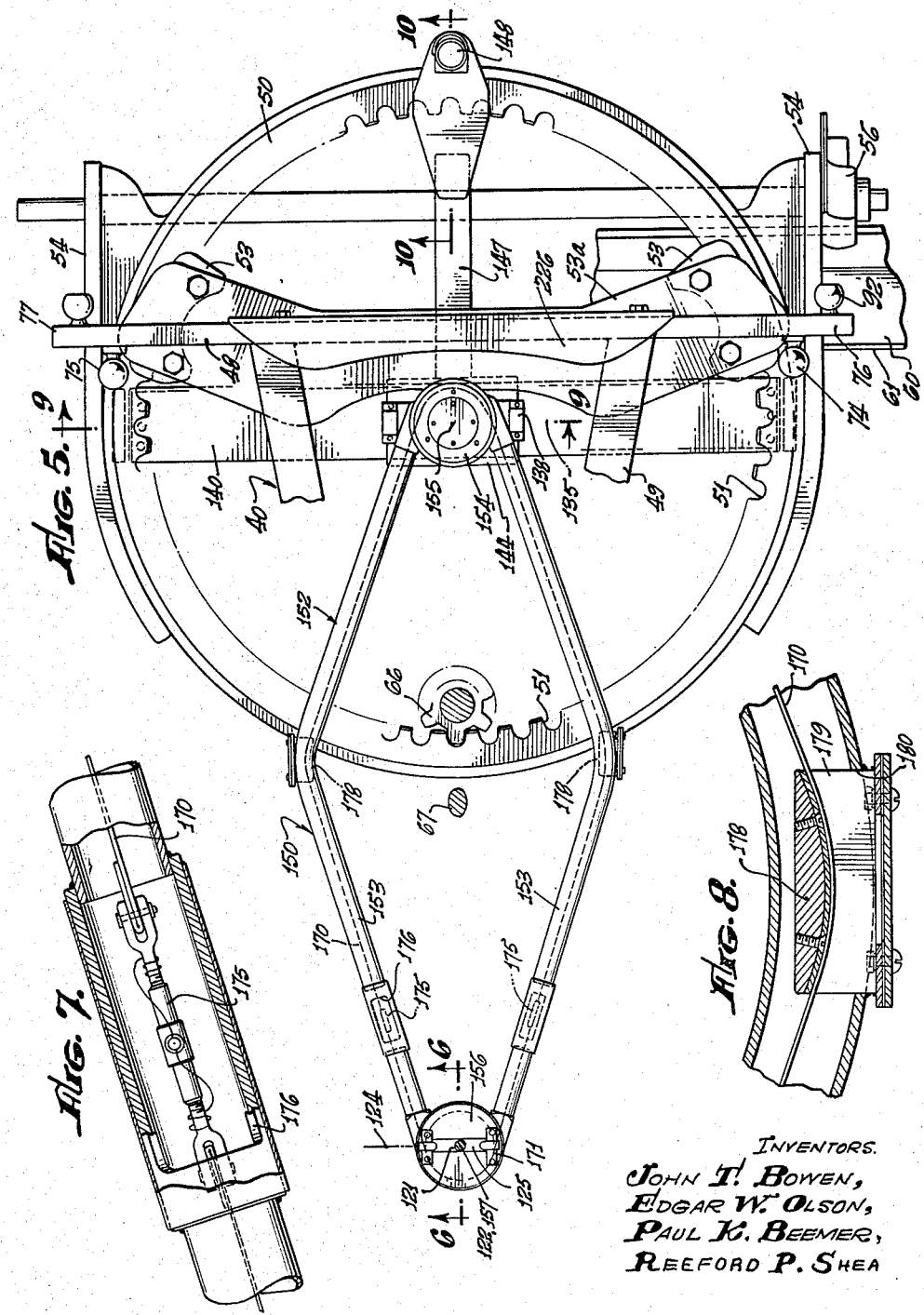

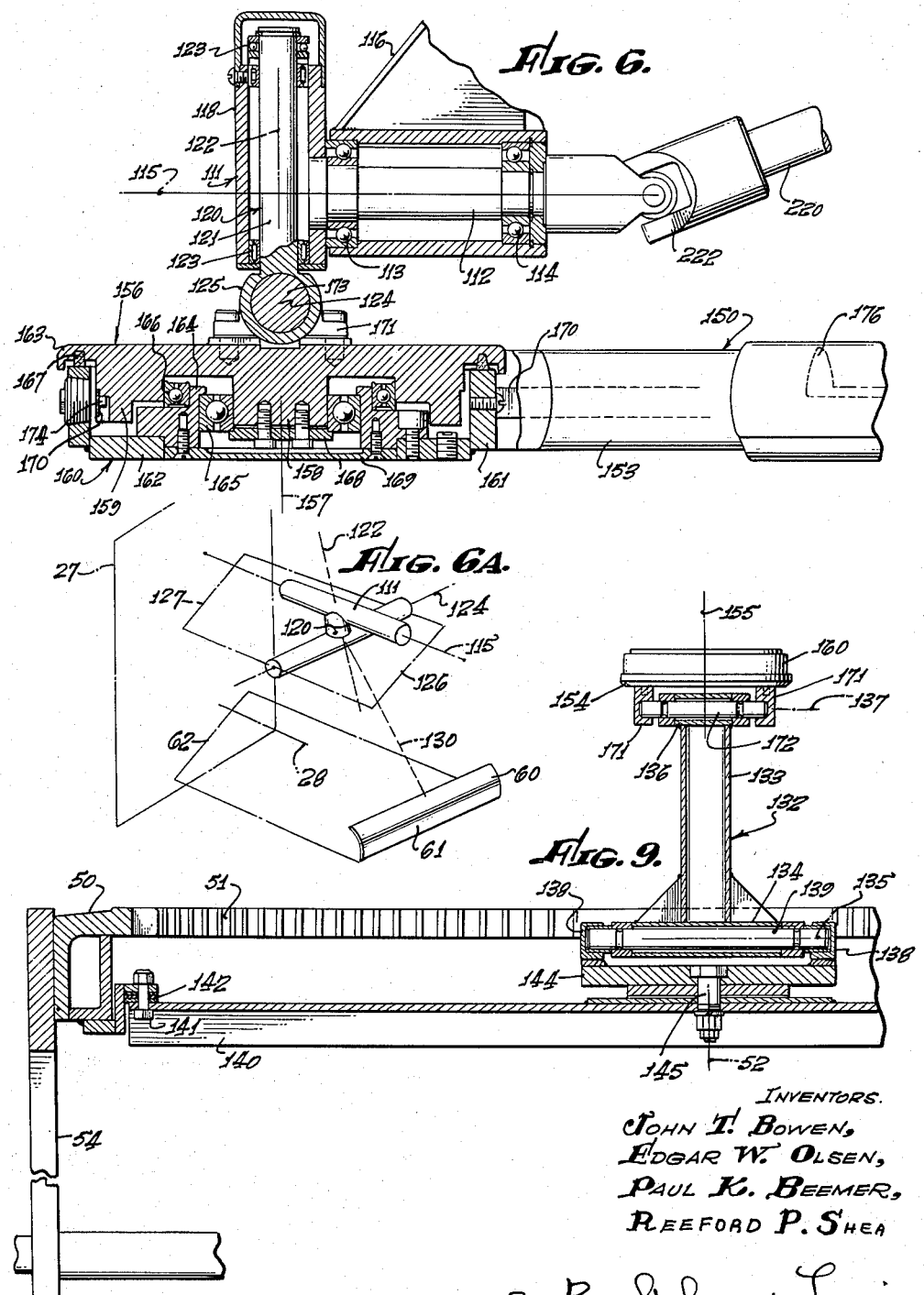

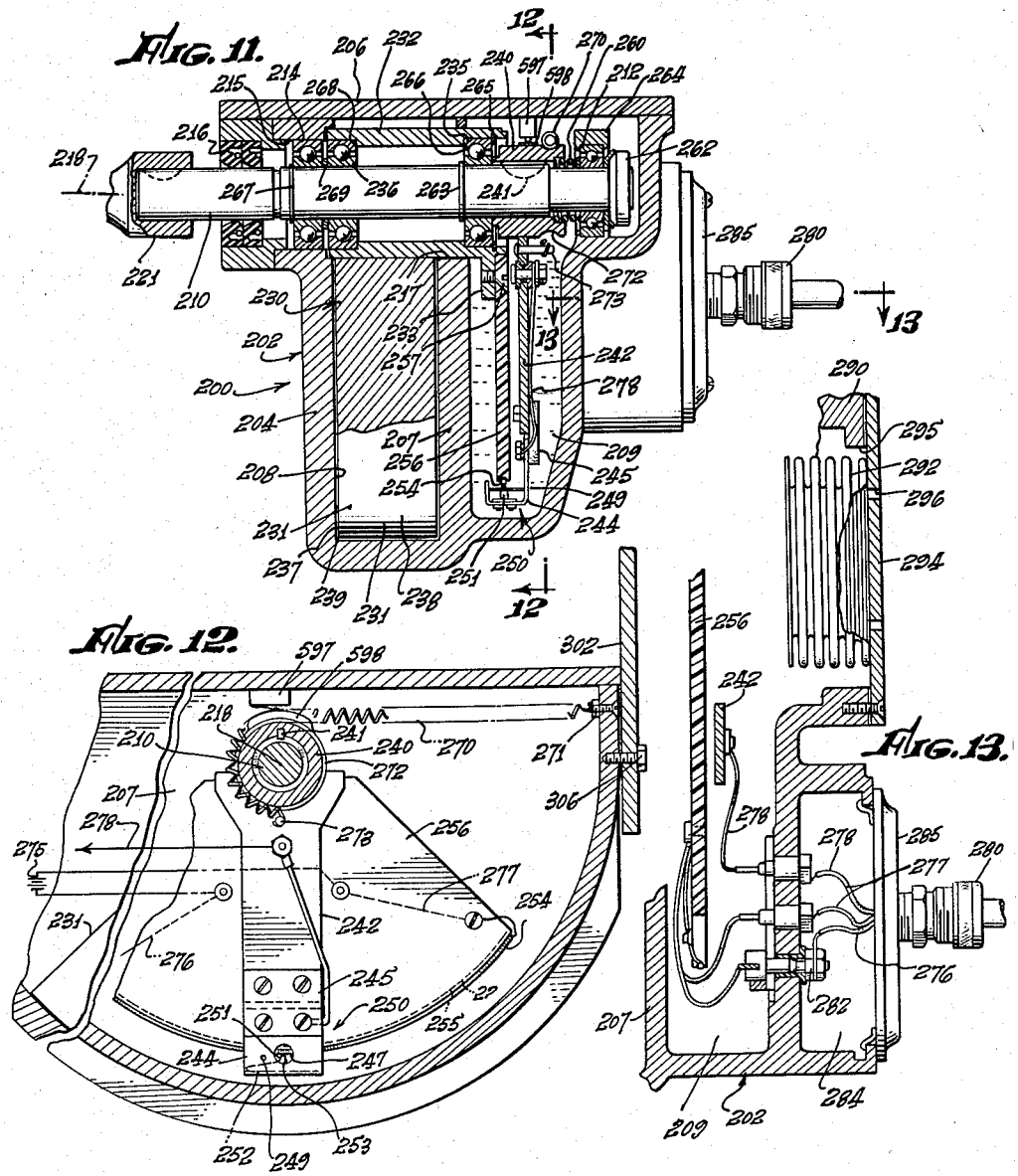

Nov. 29, 1960 J. T. BOWEN ET AL 2,961,783
CONTROL SYSTEM FOR A VEHICLE-MOUNTED TOOL
Filed Jan. 16, 1957 9 Sheets-Sheet 6

INVENTORS.
JOHN T. BOWEN,
EDGAR W. OLSON,
PAUL K. BEEMER,
Reeford P. Shea

By Barlelew + Lewis

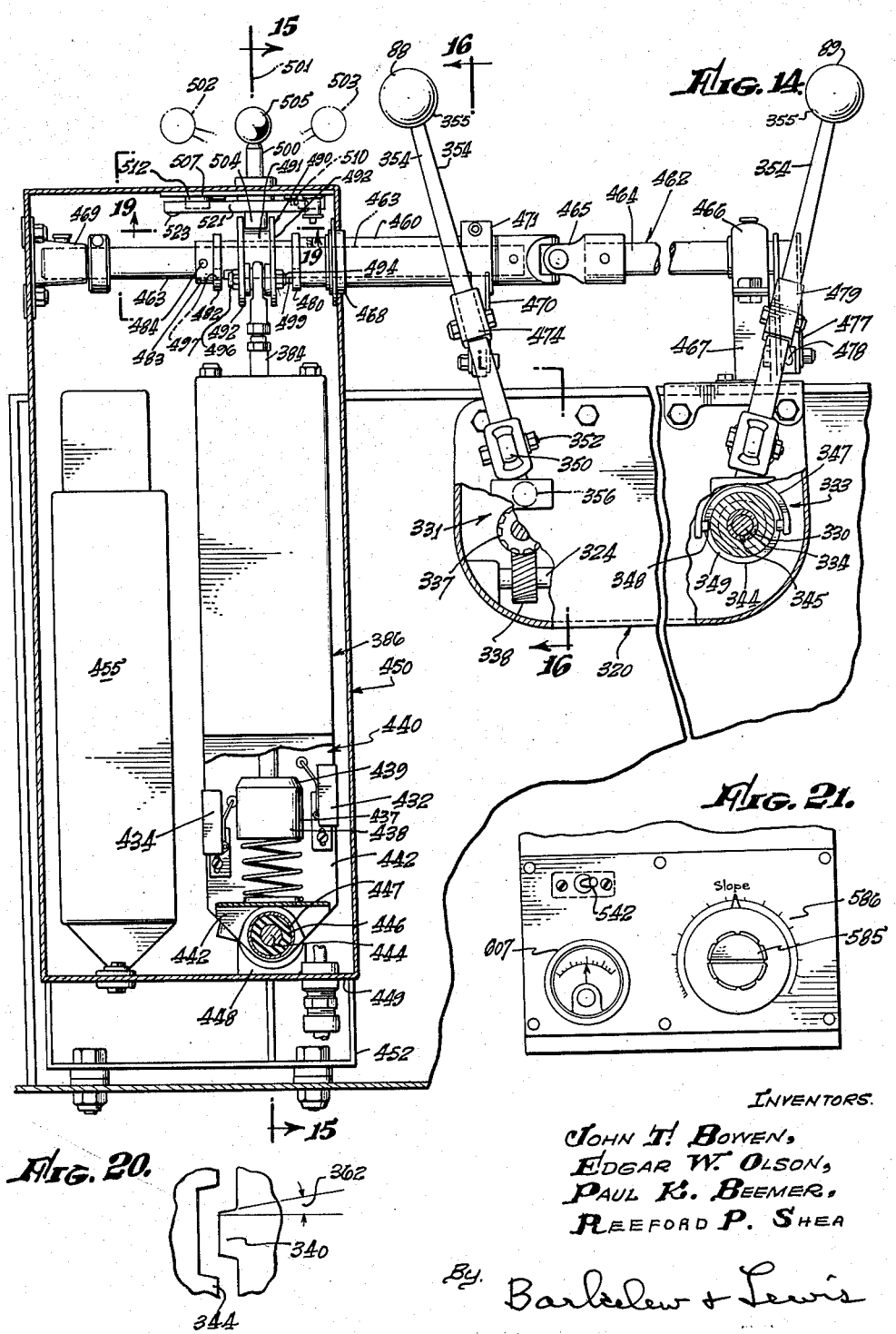

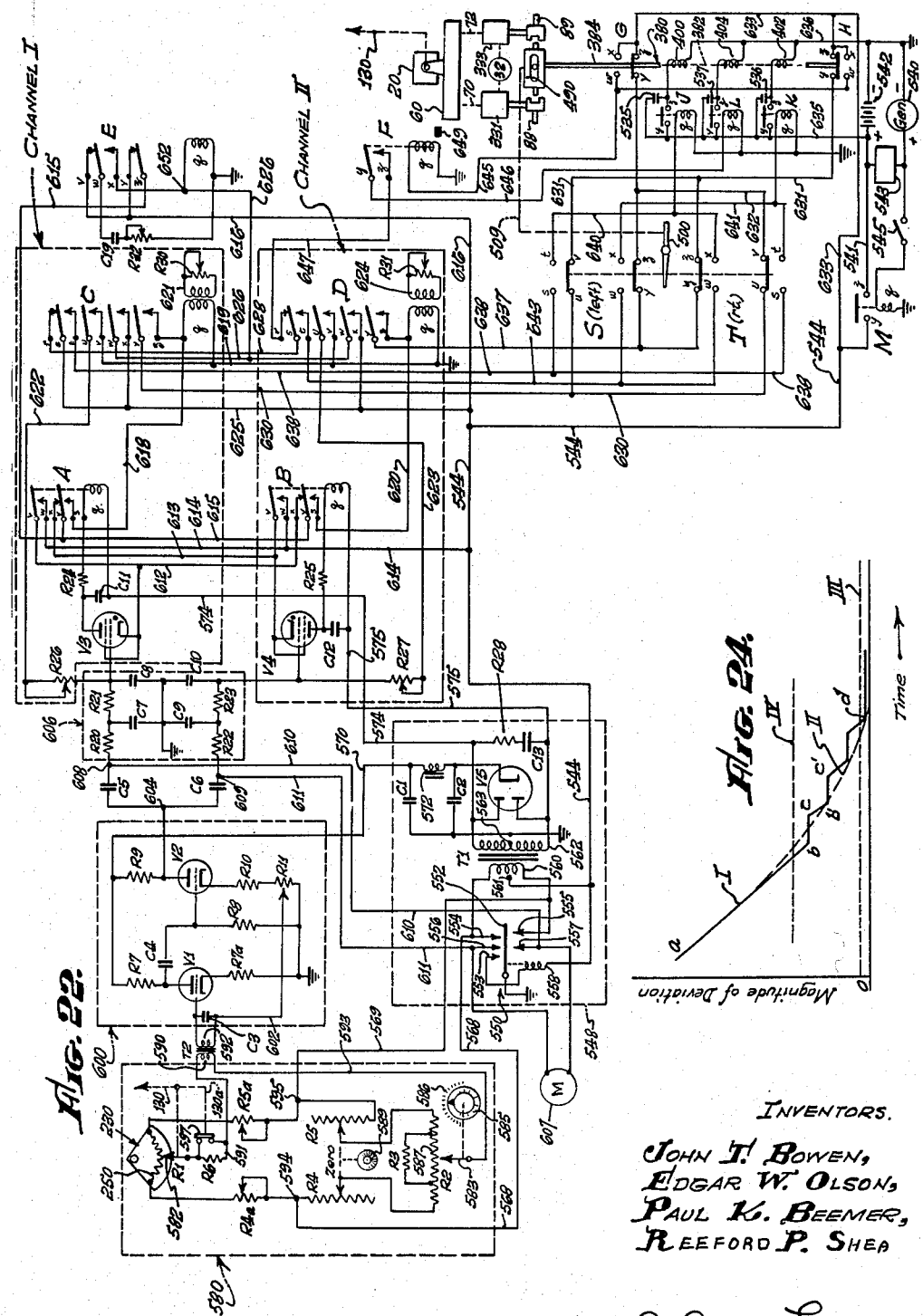

Nov. 29, 1960   J. T. BOWEN ET AL   2,961,783
CONTROL SYSTEM FOR A VEHICLE-MOUNTED TOOL
Filed Jan. 16, 1957   9 Sheets-Sheet 9

INVENTORS.
JOHN T. BOWEN,
EDGAR W. OLSON,
PAUL K. BEEMER,
REEFORD P. SHEA

By Barkelew & Lewis

United States Patent Office 2,961,783
Patented Nov. 29, 1960

2,961,783
CONTROL SYSTEM FOR A VEHICLE-MOUNTED TOOL

John T. Bowen, La Habra, Edgar W. Olson, Los Angeles, Paul K. Beemer, Laguna Beach, and Reeford P. Shea, Riverside, Calif., assignors to Preco Incorporated, Los Angeles, Calif., a corporation of California Filed Jan. 16, 1957, Ser. No. 634,436

38 Claims. (Cl. 37—156)

This invention relates to vehicles on which tools such as earth-working tools are movably mounted, and to means for controlling the movements of such tools. More particularly, the invention is concerned with the problem of maintaining an earth-working tool in predetermined orientation with respect to a frame of reference other than the vehicle itself.

A primary object of the invention is to provide economical and effective means for maintaining a predetermined relationship between the orientation of a vehicle-mounted earth-working tool and a frame of reference that may depend both upon gravity and upon the direction of travel of the vehicle.

The invention further provides means for controlling a particular function of the tool position, especially of a tool that is movable in several degrees of freedom. The invention is particularly adapted for controlling a tool that is rotatable about an axis oblique with respect to the direction of travel of the vehicle.

A more particular object of the invention is to provide means responsive to the projection of a critical direction of such a tool upon a plane normal to the direction of travel. That critical direction may, for example, be defined by the cutting edge of an earth-working blade.

By way of illustration, the invention relates to grading machines, and provides especially economical and accurate means for controlling the grader blade of such machines in such a way as to produce a ground surface having a predetermined transverse grade angle.

Controls for such machines have previously been proposed which were responsive only to the angle between the blade cutting edge and a horizontal plane. However, the transverse slope produced by the blade is not uniquely determined by that angle, but depends also upon other components of the blade orientation. The present invention takes accurate account of those additional factors and provides for the first time direct and reliable control of the actual transverse grade angle produced by the machine. That is accomplished by providing control mechanism that is responsive to the orientation of the projection of the blade cutting edge upon a plane perpendicular to the direction of travel of the machine.

The invention further permits the value of the produced grade angle to be set conveniently at any desired value, and to be shifted continuously from one value to another during machine operation by manipulation of a single and conveniently located control which is accurately calibrated in terms of the grade angle actually produced by the machine. In preferred form of the invention, a single control system can control small grade angles with remarkably high accuracy, and that control can be extended with fully adequate accuracy over a continuous range of grade angles to values as high as 45°, for example, on each side of zero. That entire range may be covered effectively by a single dial that is conveniently available without leaving the operator's cab.

Previous control systems for vehicle-mounted tools have typically utilized reference mechanisms, such as a level glass, mounted directly on the tool or on a tool-carrying frame. That arrangement has the seeming advantage that the relation between the tool and the reference direction can be sensed without regard to irregular movements of the vehicle itself.

However, it has been found that mounting of the reference mechanism in fixed relation to the tool has the serious disadvantage that it is subject in practice to relatively sharp accelerations which tend to disturb its operation and to produce excessive wear or damage. Moreover, it may be highly desirable that the frame of reference be partially dependent upon the vehicle position. The direction of gravity does not always provide a sufficiently complete criterion for control of the tool orientation. Particularly when the tool is movable in several degrees of freedom or is rotatable about an oblique axis, it may be desirable, for example, to utilize a frame of reference which is related both to the direction of gravity and to a direction defined with respect to the vehicle. Such a frame of reference cannot be established by mechanism which is mounted on the tool and is independent of relative movement of tool and vehicle.

In accordance with one aspect of the present invention, the frame of reference or reference direction with respect to which the tool is to be controlled is established by reference mechanism which is responsive both to gravity and to the orientation of the vehicle frame. That reference mechanism is preferably, although not necessarily, mounted on the vehicle frame rather than on the tool. The tool position is then compared to that frame of reference to develop a control signal. For that purpose, the tool position is in effect transferred to the vehicle frame by mechanism which is responsive to movement of the tool with respect to that frame. The transfer mechanism may develop one signal which represents the relationship of the tool to the vehicle frame. That signal may then be combined with a second signal representing the relationship of the vehicle frame to the defined frame of reference to develop a final control signal. Alternatively, the tool position, or certain components of that position, may be physically transferred to the reference mechanism and then directly compared to the defined frame of reference.

The mechanism for transferring the tool position to the described reference mechanism, which is typically frame-mounted, may, for example, comprise a mechanical linkage. In accordance with one aspect of the present invention, that linkage is preferably independent of the primary tool-supporting structure. That has the great advantage that the potential accuracy of control is not limited by such factors as deflection and backlash in the primary supporting and driving mechanism of the tool.

A further aspect of the invention involves means for computing a function of the tool orientation, which function may be dependent also upon the vehicle orientation. A particularly useful function of the tool orientation, which is illustrative of this aspect of the invention, is the geometrical projection upon a plane perpendicular to the direction of vehicle travel of a critical direction that is defined with respect to the tool. That direction may, for example, be the cutting edge of a tool such as a grader blade. The invention provides means for computing such a predermined function of the tool orientation and comparing that function with the defined frame of reference.

That computing means typically comprises a member mounted for rotation with respect to the machine frame about a member axis parallel to the direction of travel; structure carried by the member and defining a plane parallel to the member axis; bracket means defining a linkage axis and constrained with respect to the member so that the linkage axis is parallel to the plane; and a driving connection between the tool and the bracket means adapted to maintain the linkage axis parallel to the tool critical direction. That driving connection is preferably independent of the structure by which the tool is mounted and driven with respect to the machine frame.

For clarity of illustration, but without intending any unnecessary limitation upon the scope of the invention, the latter will be described primarily with respect to the illustrative example of controlling the blade of a grading machine to produce a finished ground surface having a predetermined transverse slope. A preferred embodiment of the invention for accomplishing that purpose comprises means for transferring to the machine frame the orientation of the cutting edge of the grader blade, means for computing the projection of the blade edge upon a plane perpendicular to the direction of travel of the machine, and means for comparing that projection with a frame of reference which typically depends upon the direction of gravity and upon the direction of travel of the vehicle.

In accordance with a further aspect of the invention, tool control mechanism of the described type is provided in a form that can be conveniently and economically installed on existing machines. Thus, the invention provides mechanism especially adapted in several respects to control the existing tool drive means of such machines. Although many aspects of the invention are well adapted for any type of tool positioning mechanism, it includes features which are particularly useful, for example, in connection with machines having an effectively positive type of tool drive. Many such machines utilize a continuously rotating drive shaft and a positively acting clutch for controllably driving an earth-working tool. The invention permits such a tool drive to be directly controlled in a manner to produce and maintain a desired tool orientation with great accuracy and reliability and without interfering with convenient manual control of other aspects of the tool position.

The tool drive may be shifted quickly and easily between manual control and automatic control. And means are provided by which the controlled orientation of the tool may be adjusted continuously over the entire range of available angles. That adjustment may be made either in advance or during the course of controlled tool operation. The latter type of adjustment is especially useful, for example, for either cutting or spreading on superelevated highway curves which require a smooth transition between a straightaway, having typically a grade angle of 2%, and a superelevated curve having typically a grade angle as high as 8%.

The invention further provides the operator with a direct dial indication of the angle to which the control mechanism is set, and also of the actual departure, if any, of the tool from that set orientation.

Throughout the present specification and claims, such terms as earth and ground are intended to embrace a wide variety of specific materials, including, for example, such natural or manufactured materials as sand, gravel, bituminous paving mixtures and the like.

A full understanding of the invention and of its further objects and advantages will be had from the following description of certain illustrative embodiments. However, that description, and the accompanying drawings which form a part of it, is intended only as illustration and not as a limitation upon the scope of the invention, which is defined in the appended claims.

In the drawings:

Fig. 1 is a side elevation representing an illustrative embodiment of the invention for controlling the orientation of a grading machine scraper blade;

Fig. 2 is a schematic perspective of that embodiment;

Fig. 3 is a fragmentary side elevation partly in section, corresponding to a portion of Fig. 1 at enlarged scale;

Fig. 4 is a vertical transverse section on line 4—4 of Fig. 3;

Fig. 5 is a generally horizontal section on line 5—5 of Fig. 3;

Fig. 6 is a vertical section on line 6—6 of Fig. 5 at further enlarged scale;

Fig. 6A is a schematic perspective illustrating certain principles of the projection computing mechanism of the invention;

Fig. 7 is a detail, partly in section, corresponding to a portion of Fig. 5 and at the scale of Fig. 6;

Fig. 8 is a detail, partly in section, corresponding to a portion of Fig. 5 and at the scale of Fig. 6;

Fig. 9 is a section on line 9—9 of Fig. 5;

Fig. 10 is a section on line 10—10 of Fig. 5;

Fig. 11 is an axial section of illustrative sensing mechanism in accordance with the invention;

Fig. 12 is a transverse section on line 12—12 of Fig. 11;

Fig. 13 is a horizontal section on line 13—13 of Fig. 11;

Fig. 14 is a view, partly in section, in the aspect indicated by line 14—14 of Fig. 1, and representing illustrative control mechanism in accordance with the invention;

Fig. 20 is an enlarged detail of the clutch tooth structure of Fig. 16;

Fig. 21 is a view taken on line 21—21 of Fig. 15;

Fig. 22 is a schematic diagram representing an illustrative electrical control system in accordance with the invention;

Fig. 24 is a graph illustrating operation of the servo mechanism;

Basic structure of illustrative machine

Figure 15:
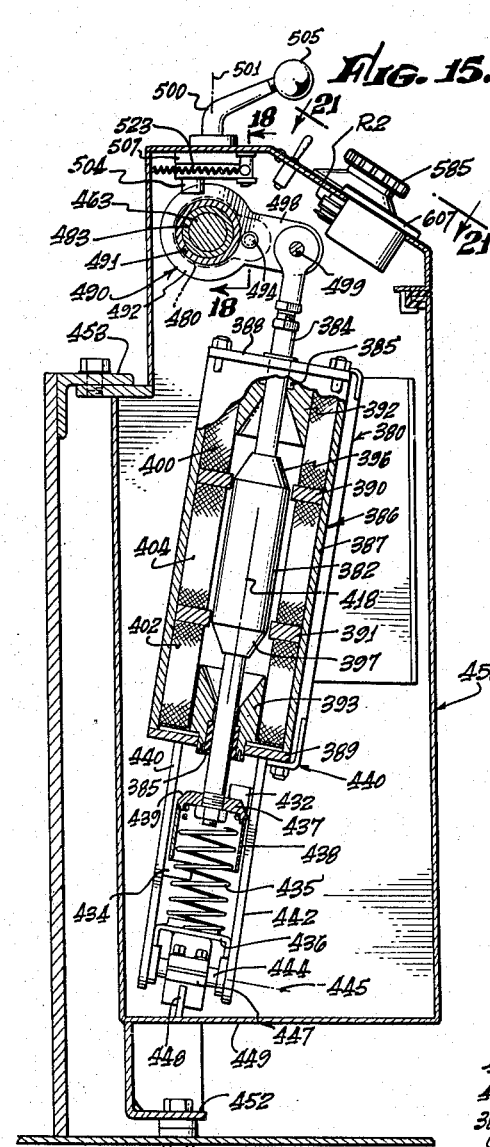
Fig. 15 is a section on line 15—15 of Fig. 14.

A grading machine of the present illustrative type is shown in partial elevation in Fig. 1 and in somewhat schematic perspective in Fig. 2. The vehicle frame comprises a unitary longitudinal frame member 20 the central portion of which is elevated, as at 21, to provide clearance for the working tools and their operating mechanism. The rearward portion 22 of frame 20 carries the operator's cab 33 and the engine 32 and is supported by the four drive wheels 34. The wheels are typically driven by a single transverse axle structure on which they are mounted without springing. The lateral inclination of the vehicle frame is thus determined positively by the ground level at the rear wheels. The forward end of frame 20 comprises a downwardly extending post portion 24 upon which the front wheel axle 36 is mounted. Front wheels 38 are typically rotatable with respect to axle 36 about vertical pivot axes in a conventional manner for steering, under manual control of steering wheel 35; and are also rotatably adjustable about horizontal pivot axes parallel to the length of the vehicle to facilitate operation on laterally sloping ground. Front axle 36 is typically freely rotatable about a horizontal axis in the central longitudinal plane of the vehicle. With that pivotal axle mounting, the front wheels can accommodate to irregularities in the ground without affecting the transverse inclination of the vehicle.

For any position of vehicle frame 20, an idealized ground plane 25 may be defined, which represents the position of a flat ground surface that would support the vehicle frame in its actual position. The actual ground surface may not be flat, and hence may not correspond to ground plane 25. The generally vertical longitudinal plane of symmetry of the vehicle frame will be referred to as the vehicle plane and is indicated at 26. Vehicle plane 26 will be considered to intersect ground plane 25 perpendicularly, and the line of that intersection, indicated at 28, will be considered to define the direction of travel of the vehicle. In actual practice those relations may not be precisely satisfied, due to irregularities of the ground, flexure of frame 20 and the like, but they provide a useful basis for description. Under certain conditions the grader may move somewhat obliquely rather than straight ahead. For clarity of description, such yawing or crabbing of the grader will be assumed to be of neglible proportions, as it normally true for a machine operated with suitable precautions.

It is convenient also to define a plane 27 which is perpendicular to direction of travel 28, and hence also to ground plane 25 and vehicle plane 26, and which will be referred to as the transverse plane. Its intersection 30 with vehicle plane 26 will be referred to as the vehicle vertical. A horizontal plane is shown at 29 for convenience of reference, and a vertical plane through direction of travel 28 is shown at 31. Direction of travel 28 is normally substantially horizontal, as indicated in the figure, and will be so considered for clarity of description. Transverse plane 27 is then vertical. The dihedral angle between vehicle plane 26 and vertical plane 31 corresponds to the transverse inclination of the vehicle frame, and is typically equal to the dihedral angle between idealized ground plane 25 and horizontal plane 29.

In the present illustrative type of grading machine, the grader blade is typically mounted on a tool carrier frame 40 known as the drawbar. Drawbar 40 is shown as a substantially flat triangular frame comprising longitudinal members 49 and a transverse member 48. The forward end of the drawbar, which forms the relatively small apex angle of the frame triangle at the junction of members 49, is mounted on front post 24 of the vehicle frame adjacent front axle 36 by means of a ball joint 42, or equivalent structure, which permits limited universal rotational movement of the drawbar with respect to the frame. Transverse plane 27 will be taken at the center of rotation of ball joint 42.

A generally circular sub-frame 50 is rotatably mounted immediately below the rearward portion of drawbar 40, with which it is essentially coplanar. The axis of rotation 52 of circle 50 with respect to the drawbar is essentially perpendicular to their common plane. Hence the position of axis 52 relative to vehicle frame 20 is dependent upon the described rotational movement of the drawbar.

The grader blade 60 is rigidly but adjustably mounted on circle 50 by means of two depending arms 54, which curve downward from opposite sides of the circle behind the blade and support the latter adjacent its lower edge. The blade is secured to arms 54 by means of brackets 56 which provide limited adjustment of the blade about an axis 57 parallel to its length. Brackets 56 may also be shiftable longitudinally of the blade to permit a greater range of blade adjustment transversely of the machine than is otherwise provided. The lower cutting edge 61 of the blade is typically straight and defines a critical tool direction which may be considered as representative of the cutting or working direction of any tool. Cutting edge 61 is typically perpendicular to, and substantially intersects axis of rotation 52 of circle 50.

Typical circle drive mechanism is indicated generally at 65, and comprises a drive gear 66 journaled parallel to circle axis 52 on the drawbar and engaging internal gear teeth 51 on circle 50 (Fig. 5). Gear teeth 51 are typically slidably received in channels of the brackets 53, fixedly mounted on the flat reinforcing member 53a of the drawbar frame, providing a rugged journal structure for the circle frame. Gear 66 is driven from a drive shaft 69 on vehicle frame 20 by means of a flexible drive linkage which is capable of accommodating the full range of drawbar movements. That linkage typically comprises an inclined longitudinally extensible shaft 67 which is connected by universal joints to shaft 69 on frame 20 and to a gear train on the drawbar, which terminates in gear 66. Shaft 69 may be driven from engine 32 via a suitable clutch which is under manual control, as by the circle control handle 68 (Fig. 2). Alternatively, the circle drive may be actuated hydraulically, in which case inclined shaft 67 is absent, being effectively replaced by flexible hydraulic conduits which may leave the space between drawbar 40 and frame 20 substantially unobstructed.

The drawbar is typically positioned by three distinct control mechanisms, which control primarily the transverse position of the drawbar and the height with respect to the vehicle frame of its two rearward corners. Those positioning mechanisms in existing machines are usually driven either hydraulically under control of manually operated valves or mechanically by means of power derived from the main power plant of the grader and under control of manually operated clutches. The present illustrative embodiment utilizes the latter type of drive. The two positioning mechanisms indicated generally by the numerals 70 and 72, respectively, control primarily the height with respect to vehicle frame 20 of the left and right rearward corners of the drawbar frame. Drawbar lift links 71 and 73 are pivoted for limited universal rotational movement, as by lower ball joints 74 and 75, on respective bracket members 76 and 77 which extend laterally from the rearward corners of the drawbar. The upper ends of the links 71 and 73 are similarly pivoted, as by the upper ball joints 78 and 79, on respective crank arms 80 and 82. Those crank arms are fixedly mounted on respective drawbar drive shafts 81 and 83, which are journaled with respect to frame 20 by means of laterally extending brackets 84 and 85. Those shafts are typically driven by power derived from the main engine 32 via respective clutches to be described more fully below. The clutch action is typically controllable by manual control handles 88 and 89, which are normally in neutral position and may be swung forward about a transverse axis to lower, or swung back to raise, the respective left and right sides of the drawbar. The eccentric throw of crank arms 80 and 82 is sufficient for most types of operation, but may be extended when necessary by variation of the lengths of one or both of links 71 and 73, which are typically of telescopic construction with suitable locking means such as bolts received in diametral bores.

Transverse movement of the drawbar is typically controlled by a third drawbar control mechanism 90, which comprises a diagonal link 91. The lower end of link 91 is pivoted at 92 on the rearward edge of drawbar frame 40, and its upper end is mounted for transverse movement with respect to frame 20. The upper end of link 91 is pivoted at 93 on a transverse rack member 95 which is slidable in suitable guideways and which is drivable by means of a gear and drive shaft under manual control by a handle 97. Rack 95 is typically arcuate to conserve space and to follow more closely the transverse drawbar movements usually required.

Operation of either of the drawbar lift mechanisms 70 or 72 causes the drawbar to rotate substantially about the diagonal axis 44 or 43 (Fig. 2) through ball joint 42 and the lower pivot 75 or 74, respectively, of the other lift mechanism. Operation of transverse drawbar control 90 causes the drawbar to swing about the axis 45 through ball joint 42 perpendicular to the plane of the drawbar. Thus, the drawbar movement can be considered to comprise rotations about three axes which are defined with relation to the drawbar itself, rather than with relation to the machine frame. Rotation about any one of those axes causes a change in the direction of the other two. The two axes 43 and 44 form an oblique angle, and all three axes are typically oblique with respect to the machine frame, and, more particularly, with respect to direction of travel 28. Since the usual movements of the tool carrier, and hence of the tool, constitute rotations about axes 43 and 44, those axes may be referred to as tool carrier axes or tool axes.

Additional working tools may be mounted on the vehicle frame, as typically represented by the scarifier indicated at 39 in Fig. 1 and controlled by mechanism 39a on frame 20. That tool, however, is not an essential part of the present embodiment, and is omitted from Fig. 2 for clarity of illustration.

The problem of controlling the orientation of a vehicle-mounted tool is relatively simple if the tool is, for example, movable only about a single axis. The problem is considerably more complex when, as in the present example of a typical grader blade, the tool is movable with respect to the vehicle frame in several degrees of freedom, particularly when those degrees of freedom are not mutually independent. Under such conditions the degrees of freedom may typically be defined alternatively from many different viewpoints. Thus, from the viewpoint of the overall operational function of the machine it is possible to define what will be denoted as functional degrees of freedom of the tool movement. For example, the grader blade of a grading machine is ordinarily movable vertically to vary the depth of cut, is movable in rotation about a generally vertical axis to vary the oblique angle at which the blade shears the soil, and is movable in rotation about the direction of travel of the vehicle to vary the transverse slope or grade angle of the ground surface produced by the cut. Furthermore, the blade may be shiftable in translation transversely of the vehicle, and may be capable of further types of movement.

The transverse grade angle, with which the present embodiment of the invention is particularly concerned, may be defined as the inclination, with respect to the horizontal, of the intersection of the finished ground surface and a plane perpendicular to the direction of travel. Transverse plane 27, already defined, is such a plane. The grade angle thus depends upon the projection 62 of the working edge 61 of the blade upon transverse plane 27, and is equal to the angle 63 between that projection and a horizontal line 59 in transverse plane 27. That definition involves the direction of gravity, but also depends upon transverse plane 27, which is perpendicular to direction of travel 28. Since the rear wheels of the grading machine typically operate on the finished surface left by the grader blade, the grade angle frequently determines the angle of ground plane 25. However, that is not necessarily the case. For example, the ground surface may be so rough that the blade does not completely eliminate inequalities in it; or the blade may be offset to one side, so that the wheels on the other side, or even on both sides, do not track the blade.

The shear angle of the blade may be defined as the angle 64 between blade edge 61 and a line, such as 55, parallel to direction of travel 28. The depth of cut is the difference of level of the ground before and after passage of the blade. For present purposes those levels may be measured either vertically or, for example, in a direction perpendicular to the finished surface.

The mechanism for driving the blade movement typically does not correspond directly to the functional degrees of freedom. Instead, the drive mechanism acts in terms of what will be called the operational degrees of freedom, which are directly related to the drive mechanism and hence to the actual operations, whether manual or power driven, by which tool control is directly exercised. The correlation between the operational and the functional degrees of freedom may be quite complex. The operator typically needs to know, if he moves a particular control lever, which functional movements of the blade will be affected; and which combination of levers he must move to produce a desired change in only one of the functional degrees of freedom.

Thus, for example, in the present instance, the primary effect of operating either drawbar lift mechanism 70 or 72 is to vary the grade angle. However, the depth of cut is also affected, and may need to be corrected by suitable operation of the other drawbar lift mechanism. Also, if it is desired to vary the depth of cut without changing the grade angle, it is ordinarily necessary to operate both lift drive mechanisms 70 and 72 in correct coordination, in order to raise or lower the left and right sides of the drawbar by suitably related distances. Those distances are not necessarily equal, and even if they are, different angular rotations of drive shafts 81 and 83 may be required to produce equal vertical travel of the two sides of the drawbar. Moreover, such movement causes appreciable transverse displacement of the blade, due to the oblique position of diagonal link 91. That displacement may need to be compensated by suitable operation of transverse drive mechanism 90. In addition, if the shear angle 64 is changed during a cut, as by operation of circle drive 65, it is in general necessary to readjust the grade angle by operating drawbar lift mechanism 70 or 72, or both.

In accordance with the present invention, the described complexities of conventional manual control are very greatly simplified by providing automatic mechanism for controlling a selected one of the operational degrees of freedom in accordance with a single functional degree of freedom. That control automatically maintains a desired condition of the controlled functional degree of freedom, regardless of such disturbing influences as irregular ground surface on the one hand and, on the other hand, displacements of the controlled functional degree of freedom that would otherwise result from the operator's manipulation of those operational degrees of freedom not under automatic control. The operator is thereby released from all concern about the controlled functional degree of freedom; and may freely manipulate the uncontrolled operational degrees of freedom without regard to the type of interactions that have been described.

In the illustrative embodiment of the invention herein particularly described, control mechanism is provided for automatically controlling a selected one of the drawbar lift drives 70 or 72 in accordance with a desired value of the grade angle. The operator is thereby released from all concern about that functional degree of freedom, and may devote his attention to monitoring other functional degrees of freedom. For example, he may freely operate the uncontrolled drawbar lift drive as may be required to maintain the desired depth of cut, without concern lest that operation will affect the grade angle. Similarly, he may freely operate the circle drive without concern for its effect upon the grade angle. The complexities of potential interactions among the several operational and functional degrees of freedom are virtually eliminated by such assignment of one operational degree of freedom and one functional degree of freedom to the automatic control system for exclusive mutual control.

A particular advantage of the present invention in its preferred form is that the control mechanism responds directly to the grade angle, as typically defined above, rather than merely to the inclination of the grader blade to the horizontal. The grade angle is not determined uniquely by the blade inclination, but depends also upon additional factors such as the shear angle. For example, if the circle drive is operated during a cut, the control mechanism of the present invention not only corrects for the change in blade inclination that may result from circle rotation, but also increases or decreases the existing blade inclination as may be required to maintain the projection 62 of the blade edge on transverse plane 27 at a uniform angle.

Sensing System

In accordance with the present invention, the existing tool orientation is sensed in terms of two distinguishable components. One of those components concerns the relation of the tool to the vehicle frame; the other concerns the relation between the vehicle frame and the direction of gravity which constitutes a reference direction. The sensing system includes sensing mechanisms independently responsive, respectively, to those two components, and apparatus which is differentially responsive to those two sensing mechanisms and which produces an output representing a relation between the tool orientation and gravity.

The relation of the tool to the vehicle frame is sensed by means which include a computing mechanism, indicated generally by the numeral 110, which is responsive to a particular function of the angular position of the critical tool direction. In the present instance, the critical tool direction is parallel to the working edge of blade 60, and the computing mechanism is responsive to the projection of that blade edge upon a plane perpendicular to direction of travel 28. More particularly, computing mechanism 110 may be considered to compute the angle, indicated at 100, between the projection 62 of the blade edge upon transverse plane 27 and the intersection 101 of that plane with idealized ground plane 25. That angle 100 will be referred to as the blade-vehicle inclination. It is quite distinct, however, from the angle 103 between the blade edge itself and ground plane 25. The computing mechanism may represent blade-vehicle angle 100 in terms of an output signal of any suitable type, which may comprise an electrical voltage or impedance, a rotary position of a shaft, or a variable spring force, for example.

The invention also provides a vertical sensing mechanism, indicated generally by the numeral 230, which constitutes a reference mechanism and provides a reference direction which is substantially vertical. Vertical sensing mechanism 230 is responsive, in effect, to the angle between vehicle plane 26 and vertical plane 31. More exactly, the vertical sensing mechanism is typically responsive to the angle 106 between vehicle vertical 30 and the intersection 104 of vertical plane 31 and transverse plane 27. Intersection 104 is itself a vertical line whenever direction of travel 28 is horizontal, which is usually substantially true. The angle 106 between that normally vertical line 104 and vehicle vertical 30 then forms a measure of the transverse inclination of the vehicle, and will be referred to as the vehicle inclination. Angle 106 is equal to the angle 106a between horizontal line 59 in transverse plane 27 and intersection 101 of that plane and idealized ground plane 25. Vertical sensing mechanism 230 may represent vehicle inclination angle 106 in terms of an output signal of any suitable type.

The invention further provides differential mechanism for deriving from the output signals of computing mechanism 110 and sensing mechanism 230 a signal which represents, in effect, the difference between the values of blade-vehicle inclination angle 100 and vehicle inclination angle 106 or 106a. The resulting differential signal represents the actual grade angle 63 at which the machine is working. That differential signal may then be compared by suitable comparison mechanism with a similar signal representing the desired grade angle. An error signal may thereby be produced which represents the magnitude and sense of the angle by which the actual grade angle departs from the desired value. That error signal may then control suitable drive means for correcting the blade position.

Projection computing mechanism

A preferred embodiment of computing mechanism 110 is shown particularly in Figs. 3 to 10. A member 111 is journaled by means of a shaft 112 with respect to vehicle frame 20 on a member axis 115 which is parallel to direction of travel 28. Shaft 112 may for the moment be considered as the output shaft of mechanism 110. As shown, shaft 112 is journaled in bearings 113 and 114 on a support bracket 116, which is part of a mounting frame 300. That mounting frame is fixedly, but preferably adjustably mounted by means to be more fully described, on the under side of vehicle frame 20 near the forward end of elevated portion 21. Member 111 includes a transverse sleeve 118, which is fixedly related to the forward end of shaft 112 and which defines a bracket axis 122 perpendicular to member axis 115. A bracket member 120 is journaled on bracket axis 122 by means of a stub shaft 121 and suitable bearings 123 in sleeve 118. Bracket member 120 includes structure defining an axis 124 which is perpendicular to bracket axis 122, and which will be referred to as a linkage axis. As shown, linkage axis 124 is defined by a cylindrical sleeve 125 which is diametrally fixed to stub shaft 121. As may be seen, especially from Fig. 6A, the described computing mechanism has the property that the angular position of member 111 about member axis 115 corresponds to the angular position of the projection 127 of linkage axis 124 upon a plane, such as transverse plane 27, perpendicular to the member axis.

A driving connection, indicated generally by the numeral 130, is provided between bracket member 120 and the tool to be controlled, which in the present instance is grader blade 60. Driving connection 130 may be of any suitable type which is capable of accommodating the several types of blade movement relative to frame 20 and which acts to maintain linkage axis 124 parallel to the tool critical direction, which in the present instance is defined by the working edge 61 of the blade. When bracket member 120 is driven in that manner, and is related to member 111 in the manner illustratively described, the rotational position of output shaft 112 with respect to frame 20 corresponds to the orientation of the projection 62 of the blade edge upon a plane perpendicular to member axis 115. Transverse plane 27 is such a plane.

The combination of driving connection 130 and computing mechanism 110 thus provides driving means for driving member 111 under control of the tool movement through an angle equal to the angular movement of the projection of the blade edge upon plane 27. That is true for any arbitrary type of tool movement. Typical tool movement comprises rotation about one of the tool carrier axes 43 or 44 (Fig. 2) which are ordinarily oblique with respect to member axis 115. Rotary movement about an axis can be described alternatively as angular movement in a plane perpendicular to the axis. From that viewpoint, driving means 110, 130 derives from angular tool movement in an arbitrary plane, for example the plane perpendicular to carrier axis 43, the component of that movement in a mutually oblique plane 27 perpendicular to member axis 115. In view of that action of driving means 110, 130, the position of output shaft 112 provides a measure of the blade-vehicle angle 100, already described, and may be considered to comprise a signal which represents that angle.

With the described structure, linkage axis 124 is, on the one hand, constrained by linkage 130 to be parallel to blade edge 61; and, on the other hand, is constrained to rotate about bracket axis 122 in a plane perpendicular to that axis. That plane, which is indicated at 126 in Fig. 6A, is fixedly related to member 111, but rotates with that member about member axis 115 and thereby accommodates universal rotational movement of axis 124. Plane 126, being perpendicular to bracket axis 122, is parallel to member axis 115 and to direction of travel 28, and is perpendicular to transverse plane 27. The intersection 127 of plane 126 with transverse plane 27 therefore coincides with the projection of linkage axis 124 upon the latter plane; and is parallel with projection 62 of blade edge 61 upon that plane. Since member 111 rotates with plane 126, its angular position corresponds directly to that of blade projection 62. From this viewpoint, bracket member 120 and the structure journaling it on member 111 represents any suitable means for defining a plane 126 in fixed relation to member 111 and parallel to member axis 115.

A preferred type of driving connection 130 is a mechanical linkage, of which an illustrative embodiment is shown particularly in Figs. 3 to 10. In that embodiment, bracket member 120 and the tool carrying member, represented by circle frame 50, are connected by a plurality of link units which are pivotally related in series to each other and to those members on pivot axes all of which are constrained to be parallel to blade edge 61. One of those pivot axes is linkage axis 124, already described. The longitudinal axes of those link units are non-parallel, and at least one of the link units is of such construction as to permit it to swing in the plane of its two pivot axes, while maintaining the latter mutually parallel.

As shown, a first, or lower, link unit 132 comprises a generally vertical leg 133 with cross arms 134 and 136 fixedly mounted at its lower and upper ends, respectively. Those cross arms are of tubular form and define parallel pivot axes 135 and 137 perpendicular to the length of the link. Those pivot axes are functionally related to linkage axis 124, and may be referred to for convenience as linkage axes. Lower link cross arm 134 is pivotally mounted with respect to blade 60 by means of a pivot shaft 139 and trunnion blocks 138. Those blocks are mounted in fixed, but preferably adjustable, relation to circle 50, and hence to blade 60. As shown, a support member 140 extends diametrically of circle 50, to which it is secured by bolts 141 and shims 142. The longitudinal axis of support member 140 is approximately coplanar with blade edge 61. A mounting plate 144 is pivotally related to member 140 on circle axis 52, as by the mounting bolt 145, and carries trunnion blocks 138. Those trunnion blocks, which define linkage axis 135, are spaced on opposite sides of circle axis 52, and are rotatably adjustable with plate 144 about the latter axis to bring the pivot axis accurately into a common plane with the working edge of the blade. Axis 135 may then be accurately aligned parallel to the blade edge in their common plane by suitable selection of shims 142 at the opposite ends of support member 140.

The rotary adjustment of plate 144 about axis 52 may be locked in any suitable manner. It is preferred, however, to employ locking means that are conveniently releasable to permit full rotation of the blade without damage to linkage 130. As illustratively shown, for example in Figs. 5 and 10, a locking arm 147 is fixed to mounting plate 144 and extends radially of axis 52 to the periphery of circle 50. The outer end of the arm may be releasably connected, as by the pin 148, to a bracket 149. Bracket 149 is welded or otherwise fixedly mounted on circle 50 in the position required to maintain accurate parallel alignment of linkage axis 135 and the blade edge. Removal of pin 148 completely releases lower link unit 132 from that constraint. When pin 148 is in position, positive stop means prevent excessive circle rotation, which might otherwise cause the linkage mechanism (to be described) to approach a dead center, in which it might be injured by raising or lowering of the drawbar. In the present embodiment that stop action is produced directly by engagement of the outer end of arm 147 and the brackets 53 which are fixed on the drawbar (Fig. 5). With pin 148 removed, circle 50 is released from that limitation on its movement, but excessive movement of linkage 130 is still positively prevented.

A second, or upper, link unit 150 typically comprises an elongated structure that is effectively rigid against torsional loads and that carries at its ends coupling members that are rotatable about mutually parallel coupling axes which are transverse with respect to the length of the link. The coupling members are pivotally related to lower link unit 132 and to bracket member 120 of computing mechanism 110, respectively, on pivot or linkage axes that are perpendicular to the respective coupling axes. Link unit 150 also comprises means for maintaining the two coupling members at its ends in such rotational relation about their coupling axes that their respective pivot axes are mutually parallel.

In the present preferred embodiment, the elongated rigid structure of link unit 150 comprises an open, generally diamond-shaped frame 152, lying substantially in a plane and comprising two spaced tubular frame legs 153. The relatively wide central opening between those legs has the advantage, for installation on grading machines having mechanical circle drive, as in the present embodiment, of avoiding interference with inclined shaft 67 of the circle drive mechanism of many conventional grading machines, since that shaft can pass freely between the legs 153 in all possible positions of the drawbar. If the circle frame of the grading machine is positioned hydraulically, the legs of link frame 130 may be straight and parallel.

The coupling members at the ends of frame 152 comprise the members 154 and 156, which will be referred to for convenience as wheels. Those wheels are journaled on respective coupling axes 155 and 157 perpendicular to the plane of the frame. The wheels are partially enclosed by respective wheel housings 160, each of which comprises a cylindrical wall 161 and an end wall 162 (Fig. 6). Each wheel housing forms a rigid connection between the two legs 153 of the link frame. A peripheral flange 163 and a felt seal 167 on each wheel provide a dust-tight seal of the open end of the housing. The wheel bearings are mounted on the inner face of housing end wall 162 by means of an inwardly extending bearing supporting flange 164. As typically shown, a main ball bearing 165 is mounted between flange 164 and the wheel hub 158, and takes outward thrust of the wheel. An auxiliary bearing 166 is mounted between flange 164 and the wheel rim 159 and takes inward thrust of the wheel. The entire bearing assembly may be disassembled by removing the one bearing retaining plate 168 from the face of wheel hub 158. That plate is readily accessible upon removal of cover plate 169 from an access aperture in housing end wall 162.

The outer face of each wheel carries structure defining a pivot or linkage axis perpendicular to the wheel axis. That structures typically comprises a pair of diametrally spaced trunnion blocks 171. Cross arm 136 of lower link 132 is journaled by the pivot shaft 172 and the trunnion blocks 171 of wheel 154 on linkage axis 137, already described (Fig. 9). Bracket member 120 of computing mechanism 110 is similarly journaled by the pivot shaft 173 and trunnion blocks 171 of wheel 156 on its linkage axis 124 (Fig. 6). The structure thus far described maintains the two linkage axes 124 and 137 parallel to the plane of link frame 152.

Relative rotation of those linkage axes in the plane of frame 152 is prevented by coupling means of any suitable type between the wheels 154 and 156. That coupling typically comprises a flexible metal band 170 which engages the peripheries of the two wheels and extends between them within the tubular legs 153 of frame 152. Band 170 is preferably positively keyed, as at 174 in Fig. 6, to each of the wheels. Means for tensioning the band are indicated as the turnbuckles 175, which are accessible for adjustment through access apertures 176 in legs 153 (Figs. 5 and 7). Provision of turnbuckles in both sides of the band permits convenient adjustment of the relative angular position of the two wheels, to make axes 124 and 137 accurately parallel. Guide means for the band are provided at the angles intermediate the length of each leg. Such guide means typically comprise the guide blocks 178 which are preferably mounted on brackets 179 which are insertable through access apertures 180 in the outer side of the tubing and secured, as by welding (Fig. 8). Dust-tight cover plates are provided for apertures 180 and 176. Guide blocks 178 are constructed or faced with suitable material over which band 170 slides with relatively little friction.

With the described structure, vertical movement of drawbar 40 relative to vehicle frame 20 is accommodated in the linkage mechanism primarily by swinging movement of linkage frame 152 about axes 124 and 137 and, to a lesser extent, by swinging of lower link unit 132 about axes 137 and 135. Lateral movement of the drawbar is accommodated primarily by swinging of frame 152 in its own plane about coupling axes 155 and 157. Particularly when the working edge of the blade is oblique to direction of travel 28, as is usually the case, each of those primary types of movement ordinarily produces movement of the other type. Regardless of such accommodation movements, the linkage maintains upper linkage axis 124 parallel to lower linkage axis 135 and hence parallel to the working edge 61 of the scraper blade.

With linkage axis 124 parallel to the blade edge, computer mechanism 110 drives output shaft 112 so that the shaft angle relative to its support 116 corresponds to angle 100 (Fig. 2) and represents the grade angle measured relative to the machine frame rather than relative to the horizontal. That information, as represented by shaft 112, may be utilized in any desired manner. For example, a radial pointer may be connected to the shaft to provide an indication visible to the operator. Shaft rotation relative to frame 20 may be employed to produce an electrical signal by means of an electrical transducer of known type, which may comprise a potentiometer supplied with a constant direct or alternating current voltage from any suitable source. Such an electrical signal can then be combined, as will be described, with a corresponding electrical signal representing vehicle inclination to produce a final output representing grade angle with respect to the horizontal.

In accordance with a further aspect of the present invention, it is ordinarily preferred to utilize the angle of shaft 112 directly as a mechanical signal which is combined with a corresponding mechanical signal derived from vertical sensing means 230 and representing inclination of the machine frame with respect to the horizontal. Those two mechanical signals are supplied to a differential device, which produces an output signal, typically of electrical form, representing the grade angle with respect to the horizontal.

*Pendulum and differential potentiometer*

Many types of transducers are known which produce a suitable control signal in response to differential movement of two elements.

In the present embodiment, the differential device is illustratively shown as a potentiometer having coaxially mounted brush and arcuate winding, one of those elements being driven with shaft 112 and the other being driven by gravity responsive means 230, which may utilize a pendulum, a gyroscope, or any equivalent device. As shown, means 230 comprises a pendulum mechanism with mass 231 directly connected to the potentiometer element that it drives (Fig. 11). For convenience of mounting on presently existing machines, it is preferred to construct the pendulum and differential potentiometer as a structural unit having an axis offset from that of computer shaft 112, and to provide a driving connection between that shaft and the unit (Fig. 3).

The pendulum and potentiometer unit, as illustratively shown particularly in Figs. 11 to 13, is indicated generally by the numeral 200. It is enclosed in a housing 202. That housing is mounted on vehicle frame 20 by means of a rigid bracket structure 300 which also carries bracket 116 and computer output shaft 112 (Fig. 3). Housing 202 comprises a main housing member 204, which is generally semi-cylindrical in form, and a flat cover plate 206. A transverse web 207 divides the interior of housing 202 into a pendulum chamber 208 and a potentiometer chamber 209. An input shaft 210 is journaled on the cylindrical axis 218 of the housing by means of the inner bearing 212, which is positively located axially of the shaft, and the outer bearing 214, which is received by a through bore 215 in the forward housing wall. Shaft 210 extends through the clearance aperture 217 in web 207. Suitable sealing means for bore 215 are indicated at 216, mounted in the outer portion of the bore. The projecting forward end of shaft 210 is coupled to shaft 112, as by the connecting shaft 220 and the universal joints indicated at 221 and 222. The provision of universal joints in that connection permits shafts 112 and 210 to be mutually offset but strictly parallel, and facilitates location of housing 202 closely adjacent the under face of the most elevated portion 21 of the vehicle frame, where it does not interfere with other mechanism and is well protected from accidental damage.

For further protection, both of pendulum and potentiometer unit 200 and of linkage mechanism 150 and computer mechanism 110, it is desirable to positively prevent extreme upward movement of the drawbar. That may be accomplished conveniently by fixedly mounting an upwardly extending guard on the rearward portion of drawbar 40. Such a guard is indicated at 226 in Figs. 3 and 5, for example, and comprises a generally vertical plate having its lower edge mounted on cross member 48 of the drawbar. The upper edge of plate 226 is so formed as to permit all normal and useful movements of the drawbar, but to engage machine frame 20 and prevent movement of the drawbar into a position that might damage the mechanism of the invention.

Supporting frame 300 for pendulum unit 200 and computer support bracket 116 typically comprises two longitudinal side plates 302 which are rigidly connected in spaced parallel relation by cross webs 304. Pendulum housing 202 is received between plates 302, and fixedly mounted, as by the bolts 306. A transverse web 305 near the forward end of frame 300 is strengthened by the longitudinal ribs 307 and carries bracket 116 and the computing mechanism already described. Frame 300 is designed to maintain computer output shaft 112 accurately parallel to shaft 210 of the pendulum unit.

Frame 300 is mounted in any convenient manner on machine frame 20 with those two shafts substantially parallel to the direction of travel 28 of the machine (Fig. 2). As shown, for example in Figs. 3 and 4, the upper portions of frame plates 302 overlap the side faces of frame 20 and are fixedly secured thereto at their forward and rear ends by means of threaded studs 311 and 313, respectively, fixedly mounted thereon. That fixes shafts 112 and 210 of the pendulum unit accurately parallel to the longitudinal axis of the machine as seen in plan. Similar parallelism to the direction of travel as seen in elevation is also important and is best provided by suitable adjustment mechanism. As shown, plates 302 are provided with longitudinal slots 310 at their forward ends and with transverse slots 312 at their rearward ends. Threaded studs 311 and 313 are fixedly secured to frame 20 in position to be received by those slots. The rearward transverse slots 312 permit rotational adjustment of the entire frame about the forward studs 311 to obtain the described alignment, after which the nuts 314 are tightened. To facilitate that adjustment, a threaded stud 316 is preferably fixedly mounted in vertical position on the under face of frame 20 in position to pass through a hole in the rearward cross web 306 of frame 300. Nuts 317 on stud 316 above and below web 306 then permit accurate adjustment of frame 300 and rigid locking of its adjusted position. That adjustment obviously affects the action of the pendulum, particularly when the grading machine is operating on a relatively steep transverse slope. It also affects significantly the action of computing mechanism 110, since the projection of blade 60 upon a plane perpendicular to computer axis 115 typically varies significantly as that axis departs from the horizontal. In fact, the described adjustment can readily be checked by setting the blade on a horizontal surface at widely different shear angles and observing whether the zero grade angle is correctly indicated by the sensing system for all positions.

Pendulum 230 is journaled coaxially of shaft 210 within pendulum chamber 208 of the housing. As illustrated, the pendulum comprises a hub sleeve 232 carrying a mass 231 of sector form, rigidly mounted as by welding. It has been found particularly economical and effective to journal pendulum 230 directly on shaft 210, as by the inner and outer bearings 235 and 236, respectively, which are received within hub sleeve 232. The inner end of hub 232 extends through clearance bore 217 in housing web 207 into potentiometer chamber 209, and carries a peripheral flange section 233 in that chamber adapted to form a mounting bracket for a first potentiometer element. A mounting for a second potentiometer element is rotationally fixed to shaft 210 between the bearings 212 and 235, and is shown as the hub 240. Hub 240 is keyed to shaft 210 at 241 and carries the rigidly mounted radial arm 242.

A particular feature of the present structure is the provision for damping the movement of pendulum 230. Mass 231 is preferably of sector form, with flat axial faces 237 and a cylindrical peripheral face 238. Pendulum chamber 208 is constructed with walls of complementary form which are closely spaced from mass 231, the intervening space, indicated at 239, being filled with suitable damping fluid. Particularly when the grading machine is to be used on very rough ground, it has been found that it is desirable to employ a damping fluid having sufficient viscosity to provide considerably more than critical damping.

The potentiometer 250 typically comprises an arcuate winding 254 coaxial with shaft 210 and consisting of suitable resistance wire in the form of a helical coil of relatively small diameter, and a brush 251 of electrically conductive spring material. Winding 254 is mounted in a peripheral channel 255 in a sector-shaped mounting plate 256 of insulative material which is fixedly mounted on pendulum flange 233, as by the screws 257. Potentiometer brush 251 is mounted on the inner face of a U-shaped metal bracket 244 which spacedly surrounds the winding and is fixedly mounted on arm 242 by means of an insulative connecting block 245. An aperture 247 in bracket 244 facilitates adjustment of the brush. A transverse retaining pin 249 is preferably mounted in suitably located holes in the legs of bracket 244 to limit brush travel when the brush is rotated beyond the end of the potentiometer winding. The brush proper is shown typically of sheet spring material with a flat mounting formation 252 at one end and a contact formation 253 with smooth convex face at the other end. The form of the brush as shown makes it relatively yielding in a radial direction, to facilitate uniformly light pressure on the winding, and relatively stiff in other directions to provide effectively positive definition of the contact point in the longitudinal direction of the winding.

As illustrated, the potentiometer winding is mounted on the pendulum-driven support and the potentiometer brush on the shaft-driven support. That relation is not necessary, but is preferred. It has the advantage of conserving angular space within the housing, since the winding ordinarily has a greater angular extent that the brush and the maximum angular excursion of the shaft is ordinarily greater than that of the pendulum.

In the present embodiment the axial position of potentiometer brush 251 on shaft 210 is defined by direct contact of brush hub 240 and the inner race of inner pendulum bearing 235, which is located on shaft 210 by the snap ring 263. That contact is yieldingly urged by the coil spring 260 acting between the hub and bearing 212. The latter bearing is located on shaft 210 by the retaining nut 262, threaded on the inner end of the shaft. The axial position of shaft 210 with respect to the housing is defined via bearing 212, which is mounted between fixed flanges by means of the demountable saddle 264. The axial position of the pendulum with respect to shaft 210 is defined via bearing 235, the outer race of which is held by the internal snap ring 265 in engagement with the internal shoulder 266 of sleeve 232. The two outer bearings 214 and 236 are separated by the spacing ring 269 and are collectively located axially by the snap ring 267 on shaft 210 and by shoulder 268 on sleeve 232. The parts are preferably so dimensioned that the outer bearings have slight axial freedom, leaving axial definition to the inner bearings as already described. The axial relationship of the potentiometer brush and winding is thus defined directly via bearing 235. When cover plate 206 is removed from housing member 204, both shaft 210 and pendulum 230 may be rotated to give convenient access for assembly and adjustment of the potentiometer and its electrical connections.

It is desirable to avoid any possibility of play or backlash in the mechanical connections that have been described, by which potentiometer brush 251 is angularly driven in accordance with movement of the scraper blade. That may be accomplished, for example, by yieldingly biasing that entire drive mechanism in one direction. As illustrated, a coil spring 270 is provided within potentiometer chamber 209 with one end fixed to the housing side wall, as by the screw 271. The other end of spring 270 is wrapped partially around potentiometer hub 240 in a shallow locating groove 272 and secured by the pin 273 fixed in arm 242.

As already indicated, the position of potentiometer 250, or, more precisely, the position of brush 251 on winding 254, may be considered to constitute a signal representing the existing grade angle 63 of grader blade 60 with respect to the horizontal (Fig. 2). If winding 254 is connected by the conductors 276 and 277 across source of electrical voltage 275, as indicated schematically in Fig. 12, the voltage obtained from brush 251 via the conductor 278 is an electrical signal representing the grade angle. For example, that signal voltage may be directly proportional to the grade angle, measured from some initial value. That signal may be utilized in many different ways, for example to indicate the existing grade angle to the operator, or to maintain the signal automatically at a predetermined value, and thereby to maintain the grade angle at a desired value. A particular illustrative system for the latter purpose, utilizing a bridge circuit for affording convenient and continuous variation of the desired value, will be described.

The actual electrical connections to the potentiometer may be provided via a conventional connector fitting, indicated at 280. The connections are preferably brought in sealed relation through the housing wall of potentiometer chamber 209 into an outer enclosure 284, as by means of permanent insulated fittings shown illustratively at 282. Access to outer enclosure 284 may be provided via the removable cover plate 285, on which connector 280 may be mounted. With that arrangement, potentiometer chamber 209 as well as pendulum chamber 208 can conveniently be filled with damping fluid, and no sealing means need be provided at aperture 217 of wall 207.

Pressure equalizing means are preferably provided to accommodate expansion of the damping fluid. As illustrated, potentiometer chamber 209 is formed with a circular extension 290 in which is mounted an axially extensible capsule 292 of known construction (Fig. 13). One end of capsule 292 is hermetically sealed, and its other end is mounted in sealed relation, as by solder, on the inner wall of a cover plate 294, which closes an aperture 295 in the housing wall. The interior of capsule 292 is preferably in communication with the atmosphere surrounding the housing, as via the breather holes 296.

Typical existing tool drive mechanism

Many aspects of the present invention may be utilized in connection with substantially any type of tool drive. Certain other aspects are particularly well adapted for use in connection with machines having a tool drive control that operates positively in an on-or-off manner, or that may be so operated. Such tool drives may, for example, be either hydraulic or mechanical. However, for the sake of definiteness and clarity, the invention will be described primarily with reference to an illustrative embodiment adapted for operation in connection with a particular grading machine in which the tool movements are ordinarily driven mechanically under manual control. Power for that illustrative type of drive is derived from a power shaft continuously driven from the main power plant of the machine; and is controlled, for each operational degree of freedom of the tool, by means of a positively acting clutch movable in one direction for forward drive and in the other direction for reverse drive.

Figure 16:
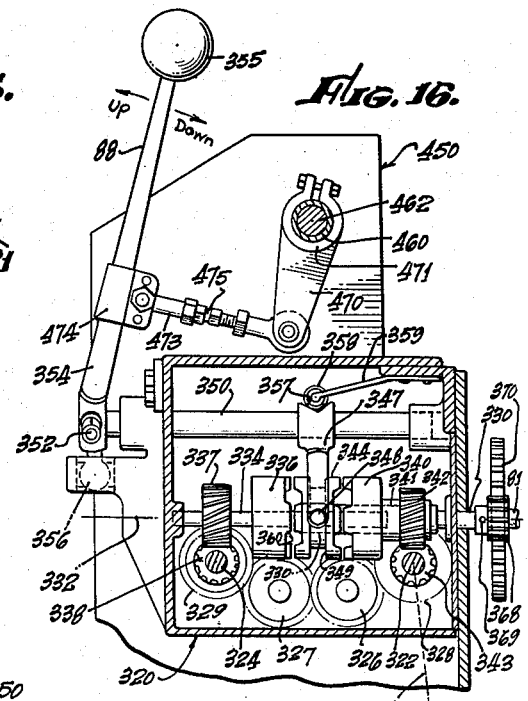
Fig. 16 is a section on line 16—16 of Fig. 14.

In that type of conventional machine, an enclosed clutch and gear housing 320 is mounted directly in front of the driver's seat in cab 33. As schematically shown in Figs. 14 and 16, housing 320 contains two oppositely rotating drive shafts 322 and 324 which are journaled in transverse horizontal relation to the vehicle frame and are continuously driven from engine 32. That drive connection preferably provides considerable speed reduction, so that at normal engine operating speed drive shafts 322 and 324 may revolve typically at approximately 300 revolutions per minute. As illustrated, shaft 322 is driven from engine 32 by means indicated schematically at 323 in Fig. 16, and shaft 324 is driven from shaft 322 by any suitable type of reversing gear train, shown illustratively as the two idler gears 326 and 327, which are connected in series between gears 328 and 329 fixedly mounted on the respective shafts. Shafts 322 and 324 are driven in such directions as to produce, via the clutch mechanisms to be described, downward and upward movement, respectively, of grader blade 60. Accordingly, they will be referred to for convenience as down drive shaft 322 and up drive shaft 324.

An individual clutch mechanism is provided for each required control function. The clutch mechanism for the left blade lift is indicated generally by the numeral 331, that for the right blade lift by the numeral 333. Each clutch mechanism typically comprises two opposed, oppositely driven dog clutch members journaled coaxially on a horizontal clutch axis longitudinal of the vehicle and just above the drive shafts. In the illustrative structure shown, a clutch output shaft 330 has its forward end journaled in the forward wall of housing 320 on clutch axis 332.

The rearward portion of shaft 330 is tubular and telescopically receives the up clutch shaft 334, the rearward end of which is journaled in the rearward housing wall. The up clutch member 336 is fixedly mounted on shaft 334, which is driven from up drive shaft 324 at substantially 1:1 speed ratio, as by the helical gears 337 and 338. The down clutch member 340 is fixedly mounted on a sleeve 341, which is journaled coaxially on output shaft 330, and is driven, preferably at the same speed as up clutch element 336, from down drive shaft 322, as by the helical gears 342 and 343.

A movable driven dog clutch member 344 is mounted between drive clutch members 336 and 340 on output shaft 330 in axially movable but rotationally fixed relation to that shaft, as by the spline structure indicated at 345. Axial movement of clutch member 344 is controlled by the fork 347, the fingers 348 of which engage a circumferential channel 349 in the clutch member. Fork 347 is axially fixed on an operating rod 350, which is axially slidable parallel to clutch axis 332. The rearward end of operating rod 350 projects from housing 320 and is pivotally related, as by the transverse pin 352, to a manual control lever 354. That lever typically is generally vertical, carries a control knob 355 at its upper end, and is pivotally mounted at its lower end, below pin 352, on the rearward outer wall of housing 320, as by the ball and socket joint indicated at 356. Lever 354 typically projects well above the top face of housing 320 and is conveniently accessible to the operator. In Fig. 14 only those two control levers 354 are shown which correspond to left and right drawbar lift control levers 88 and 89, previously described.

The two axial faces of movable clutch member 344 and the opposing faces of up clutch member 336 and down clutch member 340 are provided with inter-engageable formations, shown as the clutch teeth 360 to be more fully described below. Resilient means are preferably provided for maintaining movable clutch member 344 normally in neutral position, as illustrated, in spaced relation to both driving clutch members. Such means are schematically represented by the cam groove 357 in the hub of fork 347 and the cam follower 358, which is yieldingly urged by its spring mounting arm 359 into cam groove 357.

Clutch output shaft 330 may be connected to the actual tool drive in any convenient manner, as via a gear train which may include a worm gear. As shown schematically in Fig. 16, the output shaft 330 of clutch mechanism 331 carries a pinion 368 which engages a spur gear 370 on the crank arm drive shaft 81 of left drawbar lift mechanism 70 already described. Shaft 83 of right drawbar lift mechanism 72 is typically driven in a similar manner by clutch mechanism 333 under control of manual lever 89. The crank arms 80 and 82 are thus driven at a greatly reduced speed, typically moving one end of blade 60 at a speed approximating 4 inches per second at normal engine operating speeds.

The opposing clutch teeth are typically so dimensioned that when the clutch members are in engaged position, they have appreciable rotational play. However, once the opposing teeth have made contact the drive is positive. Thus, the clutch is either completely disengaged or is positively engaged. Clutch teeth 360 are typically of trapezoidal form, as shown best in the schematic development of Fig. 20. The angular relation of the working faces 361 of the teeth produces an axial thrust tending to disengage the clutch. That axial thrust is proportional to the sine of the face angle, indicated at 362, and to the magnitude of the torque that is being transmitted by the clutch. In normal operation that torque is relatively small, and the resulting thrust toward neutral clutch position is scarcely noticeable to the operator. It is readily overcome, along with the uniform restoring force produced by cam 357, by moderate pressure on handle 355. However, if the tool should encounter any obstacle strongly opposing its movement, the resulting increase in thrust acts as a safety device. The increased thrust is readily felt by the operator, who is thereby informed of the obstruction and can take appropriate action. Moreover, the angle 362 is preferably so selected that any reasonable force exerted by the operator on handle 355, for example a force of 50 pounds, cannot hold the clutch engaged against a transmitted torque that is high enough to damage the apparatus. As a further precaution, a shear pin is preferably provided at an appropriate point in the drive connection between the source of power and the tool. Such a shear pin is indicated illustratively at 369 between the hub of pinion 368 and shaft 330. That shear pin is typically strong enough to transmit the full torque that the clutch will transmit under the maximum control force that the operator is likely to apply.

Electro-mechanical actuator

In accordance with one aspect of the present invention, the described existing clutch mechanism may be utilized substantially without modification for effecting automatic control of the tool drive. An electro-mechanical actuating mechanism is provided, for generating mechanical control movements in response to the tool sensing mechanism already described; and those mechanical movements are selectively coupled by suitable mechanism to the appropriate intermediate clutch member 344. In the present illustrative embodiment, that coupling mechanism utilizes the existing control levers 354. A mechanical switching device is connected between the electro-mechanical actuator and the control levers, and may be shifted between a neutral position in which the control system is inoperative and two operating positions in which mechanical movement is transmitted selectively to the operating handle of the left or right blade lift mechanism. Moreover, a reversing device is provided, preferably incorporated with the switching mechanism. The reversing device controls the direction of tool drive in such a way that whichever control handle is connected will be actuated in the correct direction to return the scraper blade to the desired angular orientation.

Figure 17:
Fig. 17 is a sectional detail of the armature of Fig. 15 at enlarged scale.

An illustrative electro-mechanical actuator 380 is shown especially in Figs. 15 and 17. A solenoid armature 382 is carried by the actuator rod 384. Rod 384 is slidably mounted, as by the bushings 385, on the longitudinal axis of the cylindrical solenoid core 386. That core is substantially vertical in the present instance. It comprises an outer cylindrical sleeve 387 with annular end pole supports 388 and 389 rigidly mounted at its upper and lower ends, respectively, and with two annular pole elements 390 and 391 rigidly mounted intermediate its length and forming three coil chambers. End pole supports 388 and 389 carry the rod bearings already described and also carry in fixed relation the upper and lower pole pieces 392 and 393.

Solenoid armature 382 is of generally cylindrical form with convex conical upper and lower end portions 396 and 397. Pole pieces 392 and 393 are of complementary concave conical from, arranged to fit the respective ends of the armature when it is at the upper and lower limits of its travel. All of the core elements are of material having high magnetic premeability, such as soft iron.

Upper and lower driving coils 400 and 402 are coaxially mounted within core sleeve 387 above intermediate pole 390 and below intermediate pole 391, respectively; and a centering coil 404 is similarly mounted between those poles. When the armature is in neutral position at the midpoint of its travel, as illustrated, the inner edges of the two intermediate poles are closely adjacent the respective ends of the cylindrical portion of the armature, forming with the armature body and with the central portion of core sleeve 387 a substantially closed magnetic loop. Energization of centering coil 404 by an electric current therefore tends to maintain the armature in neutral position, or to return it to that position if it has been deflected.

When the armature is at either end of its travel, the end pole piece 392 or 393 is closely adjacent the corresponding conical end portion 396 or 397 of the armature, forming with the armature and the adjacent intermediate pole piece a substantially closed magnetic circuit. Hence energization of a driving coil tends to drive the armature toward the corresponding end of its travel. It is preferred to supply direct current power to all three of the coils and to wire them in such a way that the north magnetic poles of both driving coils, when energized, point in the same direction, while that of the centering coil is oppositely directed. That has the advantage that energization of the centering coil is more effective to release the armature from the end pole piece.

The force exerted by each driving coil increases rapidly as the armature approaches the end pole piece. Hence, if the solenoid assembly and energizing current are engineered to provide sufficient armature driving force to insure prompt and rapid acceleration of the armature and its driven load from central position, the same energizing current tends to cause the armature to become effectively locked upon reaching the end of its travel. That would have the effect of locking the blade control clutch in driving position and preventing its release in response to an excessive driving torque.

That potential difficulty is overcome by inserting in the driving connection between armature 382 and clutch control lever 354 yielding structure that permits the lever to return to neutral position despite armature deflection, but only in response to a force that exceeds a predetermined value. That value is preferably selected to correspond to a force at manual control handle 355 somewhat less than can conveniently be exerted by the operator. With that arrangement, if armature 382 is held at one end of its travel by energization of one of the driving coils 400 or 402, engaging one of the blade lift control clutches via the linkage to be described, the operator can conveniently counteract that action by manually returning the control handle 355 to neutral position.

The described yielding action is preferably provided between the armature body and the limit switches to be described, which in the present embodiment are operated effectively by actuator rod 384. A particularly convenient and effective manner of providing such yielding means between armature 382 and actuator rod 384 is shown best in Fig. 17. Actuating rod 384 comprises a solid rod core 410 upon the central portion of which two spacedly opposed shoulders 412 are mounted in fixed axial relation. As shown, those shoulders comprise the opposed axial faces of two washers 413 which are spaced by the spacing sleeve 414. The assembly of washers and spacing sleeve is fixedly located on rod core 410 by means of sleeves 415 and 416, which project outside of solenoid core structure 386 and abut suitable retaining means near the ends of the actuating rod. As shown, the retaining means include nuts adapted to compress and securely anchor the tube assembly. All of the parts 410 and 412 through 416 thus comprise an effectively unitary actuating rod 384.

Armature 382 is fitted at its ends with bushings 420 which slidingly engage sleeves 415 and 416. The axial bore 422 of the armature is provided with two sets of inwardly facing shoulders 423 and 425. The inner shoulders 423 are spaced apart by a distance typically equal to the length of spacer sleeve 414 on the actuating rod. Two spring-defining bushings 427 and 428 are slidably mounted on sleeve 414 and are strongly urged apart by the pre-loaded coil spring 430. The outer bushing faces normally engage both the armature shoulders 423 and the actuating rod washers 413. The longitudinal position of the armature on the actuating rod is thereby defined in a manner that is effectively positive under normal conditions. However, that position can be displaced in either direction by an applied force sufficient to compress spring 430. In the present embodiment that critical force is typically of the order of 70 pounds, and corresponds to a force exerted at the manual control knob 355 approximately equal to 50 pounds.

The described axial movement of the armature on the actuating rod is positively limited by engagement of one or other of the outer set of internal armature shoulders 425 with the outer axial face of the adjacent washer 413. The relative travel permitted is preferably at least sufficient to permit the blade lift clutch member 344 to be manually returned to neutral position (Fig. 16), while the armature remains against the solenoid pole 392 or 393. The armature body may be initially made in two parts which are rigidly joined at 398, as by welding, after assembly of the described parts.

The entire solenoid assembly 380 is preferably mounted at its lower end for limited universal rotation about a point on the axis 418 of actuator rod 384. As shown best in Figs. 14 and 15, a bracket frame 440 is rigidly connected to solenoid core 386 and carries the two downwardly extending ears 442 which are spaced on opposite sides of axis 418. A pivot bolt 444 is mounted in aligned bores in ears 442 and defines a transverse pivot axis 445. Pivot bolt 444 is surrounded by a relatively thick rubber bushing 446, which is set in a sleeve 447 rigidly supported by a bracket 448 on a suitable fixed frame member indicated at 449. Pivot bolt 444 permits rotation of the entire assembly about axis 445, while bushing 446 is sufficiently yielding to permit limited rotation about a perpendicular axis.

The effect of gravity on armature 382 and actuating rod 384 is preferably compensated, as by the coil spring 435. One end of spring 435 abuts a web 436 fixedly mounted between bracket ears 442. The other end of the spring is received by the inverted cup 437, which is fixedly mounted in coaxial relation at the lower end of actuator rod 384. The cylindrical sleeve portion 438 of cup 437 may be provided with a conical upper edge 439 which is adapted to act as a cam for operating the upper and lower electrical limit switches 432 and 434.

The solenoid assembly is preferably mounted within a protective cabinet 450, which may also enclose substantially all of the electrical control mechanism, to be typically described, for supplying actuating currents to solenoid coils 400, 402 and 404 in response to electrical signals received from potentiometer 250, already described. Cabinet 450 may be mounted at any convenient position on the machine. In the present embodiment it is mounted, as by bracket structure indicated at 452 and 453, in the operator's cab on the left side of the tool drive clutch housing 320, already described, and extends somewhat above the top of that housing (see Figs. 1 and 2).

Selective coupling and switching mechanism

The upper end of actuator rod 384 can be coupled selectively to either one of the control levers 88 or 89 by mechanism shown particularly in Figs. 14 to 19 and now to be described. Two shafts 460 and 462 are journaled transversely of the grading machine immediately above clutch housing 320. Those shafts are connected at one end by crank means to the respective control levers 88 and 89, and at the other end enter cabinet 450. As shown, the two shafts are coaxial. Shaft 462 is fabricated for convenience of assembly and alignment as a driving portion 463 and a driven portion 464, connected by a universal joint 465. Shaft 460 comprises a tube which is journaled by a bearing 468 on the right hand wall of cabinet 450 (as seen in Fig. 14) and which encloses the driving portion 463 of shaft 462 and acts as a journal for it. A second journal for shaft portion 463 is indicated at 469, mounted on the inner face of the left hand cabinet wall. One end of driven shaft 464 is supported on driving shaft 463 by universal joint 465, and its other end is journaled at 466 on a bracket 467 mounted on clutch housing 320.

Shaft 460 is linked to left drawbar control lever 88 by the link 473 and the crank arm 470 (Fig. 16). Crank 470 is rigidly mounted on the shaft as by a clamp hub 471. One end of link 473 is pivoted on crank arm 470 and the other end is pivoted intermediate the length of lever 88 by means of a clamp fitting 474. The length of stroke communicated to the lever by a given angular movement of shaft 460 is conveniently adjustable by shifting the position of clamp 474 on the lever; and the normal angular relation of shaft 460 and lever 88 is conveniently adjustable by varying the length of link 473 at the turnbuckle 475. Shaft 462 is similarly connected to right drawbar control lever 89 by the crank arm 477, which may be permanently fixed to the shaft end beyond journal 466, the adjustable link 478 and the clamp fitting 479.

Separate driving formations are fixedly mounted on shafts 460 and 462 within cabinet 450. Those formations, which may be selectively connected to actuating rod 384, are shown as apertured radial flanges, and will be referred to as clutch plates 480 and 482. Plate 480 is fixedly mounted on the end of tubular shaft 460 within cabinet 450 and has an axial clearance bore for shaft 463. Plate 482 is fixedly mounted at a definite intermediate position on a hub 483 which is secured to shaft 463 as by the pin 484. An end of hub 483 abuts plate 480. The axial position of tubular shaft 460 on shaft 463 is thus defined by hub 483 at one end, and is defined by universal joint 465 at the other. The axial spacing of clutch plates 480 and 482 is thereby fixed.

A movable drive selecting member 490 is mounted for axial and rotational movement on hub 483 between clutch plates 480 and 482. Member 490 comprises a hub portion 491 with two axially spaced, radially extending flanges 492. A drive selection control handle 500 is journaled on a vertical axis 501 on the top wall of cabinet 450, and carries a manual knob 505 above the cabinet and an operating boss 504 eccentrically mounted within the cabinet between the flanges 492 of member 490. Rotation of handle 500 about its axis 501 shifts member 490 axially of shafts 460 and 462. Flanges 492 are provided with axially extending portions 498, which together form a crank arm to which actuator rod 384 is pivotally connected by the cross pin 499. That pin preferably provides an effectively positive connection longitudinally of rod 384, yet permits slight swinging movement of rod 384 about solenoid mounting pivot 444 in response to axial movement of member 490.

Figure 18:
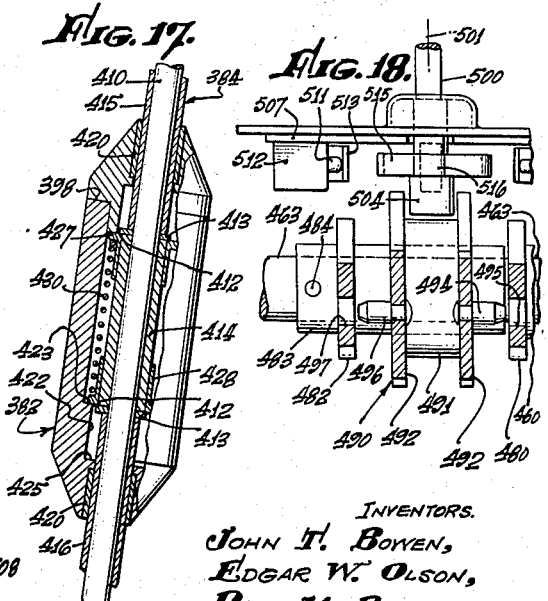
Fig. 18 is a section on line 18—18 of Fig. 15 at enlarged scale.

Member 490 carries drive pins 494 and 496 in positions to engage eccentric axial bores 495 and 497 in the respective clutch plates 480 and 482 in response to axial movement of the member to the right and to the left, respectively, from the neutral position shown in Figs. 14 and 18. Pins 494 and 496, as shown, are fixedly mounted at an intermediate radius on crank portions 498 of flanges 492. Bores 495 and 497 are formed in radial extensions of the clutch plates which are preferably sufficiently wide circumferentially to extend beyond the maximum travel of the pins.

The described parts are so proportioned and assembled that with solenoid armature 382 centered in centering coil 404, as in Fig. 15, and when blade control levers 88 and 89 are in neutral position, as in Fig. 16, pins 494 and 496 are aligned with the respective bores 495 and 496 (see Fig. 18). Selection control handle 500 may then be shifted freely between its neutral position, shown in solid lines, and its two operating positions. In neutral selector position, solenoid actuation is ineffective, since upward or downward movement of actuator rod 384 merely swings member 490 about its axis without affecting shafts 460 and 462.

Clockwise rotation of handle 500, as seen from above, to the position 502, shifts boss 504 and member 490 to the right in Fig. 14, causing pin 494 to engage the bore in clutch plate 480. Actuator rod 384 is thereby linked to tubular shaft 460 and to left drawbar control handle 88. Downward movement, for example, of the solenoid armature then causes handle 88 to swing forward, to the right as seen in Fig. 16, causing movable clutch member 344 to engage down clutch member 340, and driving the left hand side of blade 60 downward. Upward solenoid movement similarly drives the left hand drawbar support upward.

When selector handle 500 is turned counterclockwise to the position indicated at 503 in Fig. 14, pin 496 engages clutch plate 482. Downward movement of the solenoid armature then causes the right hand drawbar control mechanism to drive the right end of blade 60 downward; and upward solenoid movement causes that drawbar control to drive upward. In each instance, the drive continues at substantially constant speed so long as solenoid armature remains at the end of its travel.

In the present embodiment, the controlled variable is an angle, specifically the grade angle of the grader blade; whereas the drive mechanism utilized for controlling that angle is essentially translational in its action. That translational movement produces blade rotation, but the sense of the blade rotation produced by upward drive (for example) of the left end of the blade is opposite to that produced by upward drive of the right end of the blade. Hence, if the blade is displaced clockwise, for example, from the desired angle, that resulting signal from the blade sensing mechanism must be arranged to cause either upward or downward drive of the blade, depending upon which blade drive mechanism is being utilized. A further aspect of the invention provides selection means for that purpose in the form of electrical switching mechanism operated by selection control lever 500, already described. That switching mechanism not only performs the function of reversing the direction of drive (for a given error signal) when the control handle is shifted between its two drive positions 502 and 503; but also performs the function of electrically isolating the solenoid winding controls when handle 500 is in neutral position, as illustrated.

The latter action has the great advantage that the control system can be placed in energized and fully operative condition with the exception that its final output currents to the solenoid are cut off. The control system typically includes indicating means, such as the meter 607 to be more fully described, for indicating to the operator whether the instant position of the blade agrees with a specified position, and, if not, in which direction it is off. It is sometimes useful to the operator to obtain that information without causing the control system to automatically restore the blade to the specified position. That may be accomplished by energizing the mechanism in the usual way, but leaving control lever 500 of the switching mechanism in neutral position.

Figure 19:
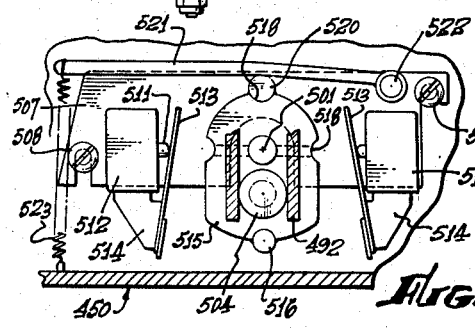
Fig. 19 is a section on line 19—19 of Fig. 14 at enlarged scale.

That switching mechanism, as illustratively shown, comprises two switch units 510 and 512, which are mounted on opposite sides of control handle axis 501 within cabinet 450 and operated by a cam plate 515 fixedly mounted on the handle (Figs. 18 and 19). Cam plate 515 also acts as a crank arm for carrying eccentric boss 504, already described. The switches are typically mounted on a mounting plate 507 which is secured to the top wall of the cabinet by the screws 508. The switch units 510 and 512 contain respective switch assemblies S and T. Those switch assemblies are operated by means of respective operating buttons 511, which may be depressed by deflection of the respective springs 513. One end of each spring is fixedly mounted on plate 507 by a bracket 514, and the free end overlies the switch button 511. Cam plate 515 carries a radially projecting boss 516 adapted to engage one or other of the springs 513 and depress the switch actuating button 511 when handle 500 is rotated to its respective drive positions.

Cam plate 515 further provides detent action for yieldingly holding selector handle 500 in its set position. The edge of disk 515 opposite from boss 516 is of circular shape with three circumferentially spaced depressions 518 at 90° intervals. A cam follower 520 is mounted on a follower arm 521 which is pivotally mounted at 522 on mounting plate 507 and is yieldingly urged toward cam plate 515 by the coil spring 523.

Clockwise rotation of handle 500, as viewed from above, to position 502 (Fig. 14) produces counterclockwise rotation of cam plate 515, as seen in Fig. 19. That action mechanically engages the left blade drive via shaft 460 and handle 88 as already described, and operates switch assembly S in switch unit 510. Opposite handle rotation to position 503 engages the right blade drive via shaft 462 and handle 89, and operates switch assembly T in switch unit 512.

The switches are connected in the electrical control system in such a way that, for any particular error signal from the sensing system, operation of switch S and of switch T cause solenoid actuator 380 to be driven in opposite directions. When neither switch S nor switch T is operated solenoid action is disabled. Typical electrical connections for that purpose are shown schematically in Figs. 22 and 23 and will be described.

The parts of the switch actuating mechanism are so proportioned that switch actuation by the cam mechanism does not occur until after full mechanical engagement of pin 494 or 496 in its clutch plate 480 or 482. With that arrangement, solenoid actuator 380 cannot be electrically actuated until after it is positively linked mechanically to one blade drive mechanism or the other.

In the present embodiment, opposite control action on the two control handles 88 and 89 is produced by the switch means just described. Alternatively, other means for inverting the action may be provided. For example the two crank arms 470 and 477 may extend in opposite directions, instead of both downward, from their respective shafts.

*Servo control system, general*

Control means of any suitable type may be provided for energizing the windings of the described electromechanical actuator in response to the described signal from potentiometer 250 in such manner that the blade drive mechanism automatically drives blade 60 in a direction tending to cause the potentiometer signal to have a desired value. The overall system then operates automatically to maintain the actual grade angle at the value that corresponds to that selected signal value.

Illustrative electrical circuit means for energizing solenoid windings 400, 402 and 404 in response to the signal from potentiometer 250 are illustrated schematically in Fig. 22. The actual physical components to be described may be mounted on any suitable type of supporting chassis, indicated schematically at 455 in Fig. 14, within cabinet 450. Particularly in an earth working vehicle of the present type, mechanical vibrations and spurious electrical interactions are difficult and expensive to eliminate. The electrical system to be described is especially effective in minimizing such difficulties, as will appear.

In Fig. 22 a movable element to be controlled is represented schematically at the right of the drawing as the grader blade 60, mounted on machine frame 20. The relative movement of those members is transmitted via a suitable linkage, represented schematically as the broken line 130, to the brush of potentiometer 250, shown at the upper left of Fig. 22. The intermediate portion of line 130 is omitted for clarity of illustration. The winding of potentiometer 250 is movable with pendulum 230, as represented schematically.

The left and right drawbar lift mechanisms 70 and 72 are represented as schematically-shown linkages between blade 60 and the left and right two-way clutch mechanisms 331 and 333, respectively, which receive power from drive means represented as the engine 32. The manual clutch control handles already described are indicated at 88 and 89. Solenoid actuator 380 is selectively engageable with either of those handles by means of selector mechanism 490. Control of that mechanism is exercised, as indicated by the dashed line 509, by means of the handle 500, which also controls the switch assemblies S and T in the manner already described.

The two solenoid driving windings 400 and 402 and centering winding 404, already described, are shown schematically at the lower right of Fig. 22. Those windings have one terminal grounded and the other connected to a voltage source via the switches of the respective power relays J, K and L, which may, for example, comprise conventional heavy duty contactors of automotive type. The relay switches are shunted by the respective arc suppressing capacitors 535, 536 and 537.

A source of direct current power is indicated schematically as the generator 540 and storage battery 542, which have their negative terminals grounded and their positive terminals connected together in the usual manner via the voltage-regulating cut-out switch 543. Those elements may typically be part of the regular equipment of the grading machine. The positive terminal of battery 542 is connected to the main power line 544 of the present electrical control system via the line 541 and the normally open switch yz of a cut-out relay M. The winding q of relay M is connected via the manual master switch 545 between ground and the positive terminal of generator 540. Hence the system can be energized by closure of master switch 545 whenever the generator is operating, but is cut off by release of relay M if the generator is idle. Generator 540 and battery 542 typically maintain line 544 at a relatively low voltage, such as 6 or 24 volts, for example, with respect to ground; and that voltage source will be taken as positive for definiteness. The electrical term "ground" in the specification and claims may refer to any convenient reference level of potential, which is represented illustratively in the conventional manner.

A power supply system, indicated generally by the numeral 548, comprises the vibrator 550, the step-up transformer T1 and the full-wave rectifying tube V5. That system develops from the power on line 544 a higher voltage for operation of the electronic tubes of the system and a square wave voltage for operating the bridge network to be described. Vibrator 550 has a grounded conductive reed 552 which engages a driving contact 553, a primary set of working contacts 554 and 555, and a secondary set of working contacts 556 and 557, arranged typically as shown in Fig. 22. The driving winding 558 of the vibrator is connected between line 544 and driving contact 553. The vibrator frequency may have any suitable value, such as approximately 100 cycles per second, for example.

The primary winding 560 of transformer T1 is connected directly between primary vibrator contacts 554 and 555 and has a center tap 561 which is connected to line 544. Upon operation of vibrator 550, an alternating current voltage of substantially square wave form is applied to T1. The same square wave voltage is supplied via the lines 568 and 569 to the bridge network to be described. For purposes of description, the square wave voltage from line 568 to ground will be taken as the direct phase, that from line 569 to ground as the inverted phase. The secondary winding 562 of transformer T1 is connected between the two plates of rectifying tube V5 and has a grounded center tap 563. The cathode of V5 is connected to the line 570 via a filter network comprising the series connected choke coil 572 and grounded capacitors C1 and C2. The end terminals of transformer secondary 562 are also connected to the lines 574 and 575, which supply the high voltage square wave in direct and inverted phase, respectively, as plate voltage to the gas tubes V3 and V4 to be described. The transformer secondary is shunted by a buffer circuit comprising series connected resistance R28 and capacitor C13, to smooth the sharp voltage peaks that would otherwise result from the abrupt make and break action of the vibrator.

*Bridge circuit*

An illustrative sensing circuit of bridge type is indicated generally by the numeral 580. The four arms of the bridge comprise primarily the two resistances into which potentiometer R1 is divided by its movable contact 582 and the two resistances into which potentiometer R2 is divided by its movable contact 583. Alternating current power is supplied to the bridge from lines 568 and 569, already described, at the terminals 594 and 595, respectively. The bridge output is taken between the movable contacts 582 and 583 of the potentiometers R1 and R2. The position of potentiometer R1 may be considered in general to represent the actual condition of some physical variable that is to be controlled, whereas the position of potentiometer R2 represents the desired condition of that variable. In the present overall system, potentiometer R1 corresponds to potentiometer 250 already described (Figs. 11 to 13), and is driven by a dual input system, indicated schematically in Fig. 22. The position of the potentiometer winding is typically controlled by swinging of pendulum 230, and the potentiometer brush is driven from grader blade 60 (indicated at the extreme right of Fig. 22) via the linkage system 130.

Potentiometer R2 is typically set manually, as by the control knob 585, and its position may be considered to represent the desired value of the physical variable to be controlled. A scale, indicated at 586 may be provided, calibrated directly in terms of that variable. In the present instance, scale 586 directly indicates the grade angle each side of zero, for example in percent of slope, in slope ratio, or in degrees. It is difficult to present conveniently on a single scale the entire range of grade angles that can be controlled and indicated. That range typically extends to angles as high as 45° on both sides of zero. The range of grade angles near zero, say between slopes of plus and minus 20% need to be controlled and indicated with relatively high accuracy, requiring correspondingly widely spaced calibrations on the scale. However, at higher grade angles less accuracy is required and it is permissible to have the scale calibrations relatively compressed. It has been found possible, by taking advantage of that fact, to provide fully effective and highly convenient coverage of the entire range of grade angles on a single dial.

That is done by providing a shunting resistance R3 across a definite central portion 587 of the winding of R2. Brush movement over that portion then produces a relatively smaller effect upon the bridge circuit than a similar movement on either side of that portion. Accordingly, scale 586 has a relatively magnified central portion, typically extending between slopes of plus and minus 20%, which corresponds to shunted resistance portion 587 and facilitates accurate setting; and has relatively compressed end portions, which permit setting to the accuracy required at the corresponding relatively steep grades. Hence, a relatively large range of grade angles can be effectively represented on a single scale. In the present embodiment, grade selecting potentiometer R2 is preferably mounted in cabinet 450 with its knob 585 and scale 586 conveniently available to the operator, as typically shown in Figs. 15 and 21.

Variable balancing resistances are preferably provided in the respective arms of the bridge. As shown, variable resistances R4 and R5 are connected in series with the respective sides of R2 and are ganged in opposition for control by a single knob 589. Variable resistances R4a and R5a are connected in series with the respective sides of R1 and are typically individually adjustable. Adjustment of R4 and R5 may be employed as a zero setting, to produce bridge balance when R1 and R2 are at nominally corresponding positions; and adjustment of R4a and R5a may be used as a scale setting, to insure that movement of R2 through a given scale interval will be balanced by a corresponding movement of R1.

The bridge output from the movable contacts of potentiometers R1 and R2 is supplied via the lines 591 and 593 to the primary winding 590 of the amplifier input transformer T2. The effective bridge output signal per unit angular deflection of the grader blade from its desired angle tends to increase with the grade angle, due to increasing sensitivity of the bridge when the brushes of potentiometers R1 and R2 are near one end of the windings. Also the power drive for the grader blade of a typical grading machine changes the blade angle with respect to the frame more rapidly as the blade angle increases. When the servo system is designed and adjusted for optimum operation at small grade angles, those two effects tend to cause overtravel of the blade drive at large grade angles. That is preferably avoided by providing automatic means for reducing the effective sensitivity of the sensing system at high grade angles. Such a shift in sensitivity may be produced at any convenient point of the electrical system. A particularly convenient and economical means for that purpose comprises the resistance R6 which is inserted in output line 591 and is shunted by the switch 597. Switch 597 is operatively connected in any suitable manner, indicated schematically by the dashed line 130a in Fig. 22, to be controlled by movement of grader blade 60. The switch is typically closed at angles of inclination of the grader blade smaller than some definite critical value, shorting out R6 and supplying the full error signal to transformer T2; and is opened at blade angles larger than that critical value, inserting R6 in series with the bridge and reducing its effective sensitivity by a corresponding factor. Switch 597 may, for example, be mounted within potentiometer housing 202 and operated by a suitably formed cam 598 mounted on shaft 210, as shown in Figs. 11 and 12.

*Amplifier and demodulator*

The voltage from the secondary 592 of transformer T2 is supplied as input signal to an amplifier indicated generally by the numeral 600. Amplifier 600 may be of any suitable type, and is shown typically comprising two vacuum tubes V1 and V2 coupled via the capacitor C4. One side of the transformer secondary is connected to the grid of tube V1. An inverse feedback circuit is preferably provided, represented illustratively by the line 602, which connects the other side of transformer secondary 592 to the movable contact of the potentiometer R11, which forms part of the cathode resistance of amplifier tube V2. The effective gain of amplifier 600 is adjustable by variation of potentiometer R11, and is preferably such as to produce at the amplifier output 604 a signal of approximately 10 to 20 volts for the smallest input signal to which the control system is desired to respond. That output signal constitutes an amplified error signal from bridge 580. It is typically a square wave of which the amplitude corresponds to the degree of bridge unbalance and the phase represents the direction of that unbalance. The phase of the waveform at 604 is preferably closely in phase, or 180° out of phase, with the movement of vibrator arm 552. Illustrative phase adjusting means for compensating any net phase distortion from bridge 580, transformer T2 and amplifier 600 is shown as the condenser C3 connected in shunt to the secondary of transformer T2.

The alternating current error signal at 604 is demodulated and filtered to produce two direct current control signals, which are positive and negative, respectively, when the signal at 604 has one phase, and which are negative and positive, respectively, when the signal at 604 has the opposite phase. Those two control signals are supplied to respective control channels which are responsive only to a positive signal and which act to drive the controlled variable, in the present instance the grader blade, in respective opposite directions. Demodulation of the error signal is accomplished in the present system by supplying the amplifier output from 604 in parallel to two capacitors C5 and C6 and alternately grounding the output terminals 608 and 609 of those respective capacitors in synchronism with the alternating current supplied to bridge 580. Terminals 608 and 609 are connected via the lines 610 and 611 to secondary contacts 557 and 556, respectively, of vibrator 550. The grounded armature 552 of the vibrator alternately engages those demodulating contacts in accurate synchronism with its engagement of modulating contacts 554 and 555 through which alternating current is supplied to the bridge, as already described. As a result, the potential at terminal 608 and contact 557 alternates between zero and a positive voltage when the signal at 604 is in phase with the voltage supplied to input therminal 594 of the bridge; and alternates between zero and a negative voltage when the signal at 604 is in opposite phase to that bridge input. The same is true of the potential at terminal 609 and contact 556 with respect to the voltage supplied to the opposite bridge terminal 595. Thus two complementary square wave forms are produced at 608 and 609, which are alternately zero and which depart from zero in opposite directions. The periodic potential at 608 is either positive or negative with respect to that at 609 according as the error signal at 604 is in phase with one or other of the bridge supply voltages at 594 and 595. The difference between those potentials therefore represents in magnitude and polarity the degree and direction of unbalance of the bridge, and hence represents the magnitude and direction of the existing departure of the grader blade from the desired grade angle set by potentiometer R2. That information may conveniently be presented to the operator by connecting the suitably calibrated direct current voltmeter 607 between lines 610 and 611. Meter 607 is preferably mounted in the main control panel, as illustrated in Figs. 15 and 21. The meter deflection indicates the direction of the error in the grade angle, and its approximate magnitude if it is small. However, amplifier 600 is preferably designed to saturate at large input error signals. If strictly proportional indication of the error is desired, meter 607 may be driven via a special amplifier and demodulator of suitable type.

The described periodic and substantially square wave voltages at terminals 608 and 609 may be utilized in any suitable manner for controlling the drive mechanism for the grader blade, to drive the blade in a direction to reduce the error signal. Many types of drive control systems are well known, utilizing relays, transistors, magnetic components, vacuum tubes and the like. It is preferred to supply the signal voltage of each channel to a discriminating device which determines whether or not the channel is to be actuated, and whether it should remain actuated. The continuously variable error signal is thus transformed into a two-valued signal, the two values corresponding to on and off. In the present embodiment the discriminating means of the respective channels comprises illustratively the gas tubes V3 and V4, to be described more fully. The voltages at 608 and 609 might, for example, be supplied directly to the control grids of the respective gas tubes V3 and V4, to be described. However, when the system is to be used under the rigorous conditions of the present environment, the two periodic voltages are preferably first smoothed by supplying them to suitable respective filter networks, typically represented by the series resistances R20, R21 and the grounded capacitors C7, C8 in one channel and by the series resistances R22, R23 and the grounded capacitors C9, C10 in the other channel. The filtered signals are supplied to the respective grids of gas tube V3 in control channel I and of gas tube V4 in control channel II.

Provision of the described filter networks between terminals 608, 609 and the respective gas tubes V3, V4 permits the great advantage of rendering the entire control system effectively independent of spurious signal voltages that are transient or that are periodic with a period other than that of vibrator 550. For example, in the present embodiment, the described mechanism for sensing the actual grade angle of grader blade 60 is typically somewhat responsive also to vibrational movement of the entire machine frame, such as may result from operation of the main power plant 32. Engine 32 typically operates at a speed approximating 30 cycles per second, and the resulting vibration can cause a periodic variation of corresponding period in the position of potentiometer 230. The relatively high frequency alternating current error signal at 604 is thereby modulated sinusoidally at the lower frequency of the engine vibration. The phase-sensitive demodulation of that combined signal by alternate grounding of terminals 608 and 609 does not remove the vibrational component, which appears as a corresponding modulation of the periodic signal voltages at 608 and 609.

In passing through the respective filter networks, those voltages are averaged with respect to time, and if the filters are designed with a suitable time constant the vibrational component of the signal may be effectively removed. It has been found that a filter time constant approximately three times the period of a spurious periodic signal component provides effective elimination of that signal component without unduly extending the response time of the overall system. Thus, a filter time constant of approximately 0.1 second renders the system substantially nonresponsive to engine vibration at normal engine speeds.

*Control circuits: desensitizing and timing*

Control channel I comprises primarily gas tube V3, an initial relay A and a secondary relay C; while control channel II comprises primarily gas tube V4, an initial relay B and a secondary relay D. Interlock circuits, to be described, prevents simultaneous operation of both channels. Operation of the secondary relay of either channel energizes one or other of the two solenoid deflection coils 400 and 402, depending upon which one of selector switches S and T is operated; and also causes operation of relays E and F, which perform timing and control functions to be described.

All of those relays are typically arranged to operate promptly upon energization of their respective windings; but secondary relays C and D and timing relays E and F are provided with means of any suitable type to delay their release by definite time periods following deenergization. As indicated, relays C and D have delay windings 621 and 624 which are closely coupled with the actuating windings $q$ and are shunted by respective resistances R30 and R31. Those resistances are preferably variable, as indicated, for adjusting the delay time. The delay windings may be wound on the same cores and axially adjacent the actuating windings of the relays. Relay F may be provided with a single closed loop or slug of relatively heavy copper, indicated schematically at 649, which provides a predetermined fixed release delay of about 0.2 sec., for example. The delay circuit for relay E preferably permits adjustable delay times up to about 0.5 second, for example, and typically comprises capacitor C19 and variable resistor R32 connected in a manner to be described.

The plate of gas tube V3 is connected via series resistor R24 and the winding $q$ of relay A to line 574, already described; and the plate of gas tube V4 is connected via R25 and the winding $q$ of relay B to line 575. Each plate thus receives effective plate voltage, typically about 200 volts above ground potential, only during alternate half cycles of vibrator 550. If a tube fires during the half-cycle of plate energization, it is necessarily extinguished during the following half cycle, and fires again only if the grid remains sufficiently positive. If the periodic plate energization of each gas tube is synchronized with the periodic signal voltage at the corresponding point 608 or 609, the filter networks 606 may be omitted if desired. When those networks are included, as is preferred for the present system for the reasons already stated, the grids receive substantially direct current signals and the phase relation of the periodic plate energization is immaterial. The capacitors C11 and C12 are preferably connected in shunt to the respective plate loads, and serve to maintain current flow through the relay windings during the half-cycle periods following gas tube conduction, when there is substantially zero current in the respective lines 574 and 575. Hence, in spite of its periodic nature, conduction through gas tube V3 or V4 normally causes positive operation of its primary relay A or C.

The gas tube of each channel is provided with two parallel cathode circuits to line 544. When either of those circuits is closed, and in absence of a signal at 604, the tube is normally biased beyond cut-off; for the tube grid is then effectively grounded via vibrator 550, and line 544 is positive with respect to ground by more than the tube cut-off potential. On the other hand, when bridge 580 is not balanced, producing at 604 a signal which exceeds some critical amplitude, one or other of the tube grids is raised above cut-off potential, permitting its tube to fire on the following half cycle of plate energization. For example, if the normal grid bias due to battery 542 is —6 volts and the gas tube fires at the typical value of —2 volts cathode to ground, the signal must raise one of the tube grids approximately 4 volts above ground potential to fire the tube. The tube cathodes are heated in any convenient manner, circuitry for that purpose being omitted from Fig. 22 for clarity of illustration.

Figure 23:
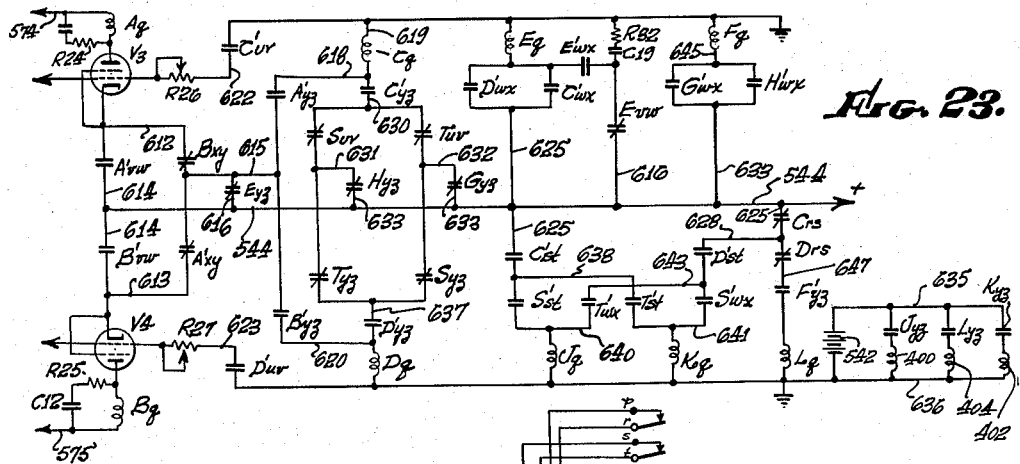
Fig. 23 is a functional schematic diagram representing the relay control circuits of Fig. 22.

For convenience of description, a particular switch of a relay or switch assembly will often be designated by the capital letter representing the relay or switch assembly, followed by the lower case letters representing the two contacts of the particular switch. A prime applied to the capital letter will indicate that the designated switch is normally open, and hence is closed only if the relay or switch assembly is operated. Absence of a prime indicates that the switch in question is normally closed, and opens on operation of the relay or switch assembly. The winding of a relay is designated by the letter $q$. Line 544, which is typically about 6 volts positive with respect to ground potential, will often be designated simply as +. That notation is employed also in Fig. 23, in which normally open switches are indicated as two transverse lines, with an oblique line added for normally closed switches. The elements in Fig. 23 are rearranged for clarity of illustration, the correspondence between the windings and switches of the several relays being indicated only by the described notation.

In the described notation, one of the cathode circuits for tube V3 is via the line 612, switch B$xy$, the line 615, switch E$zy$, and line 616 to +. The corresponding cathode circuit for tube V4 is via the line 613, switch A$xy$ and then again via line 615, switch E$zy$ and line 616 to +. Hence each of those cathode circuits is effective only if the secondary relay of the other channel is idle, and only if timing relay E is idle. That is true when the entire system is idle, and the described cathode circuits are therefore normally available for initial tube operation, and will be designated actuating circuits. The actuating circuit for each tube is disabled upon operation of the primary relay of the other tube, and also upon operation of timing relay E.

The second cathode circuits referred to are holding circuits which are normally open, but close upon operation of the respective primary relays A and B. The holding cathode circuit for tube V3 is via line 612, switch A'$vw$ and line 614 to +; that for tube V4 is via line 613, switch B'$vw$ and line 614 to +.

Operation of primary relay A or B closes the cathode holding circuit for that channel via switch A'$vw$ or switch B'$vw$, and opens the cathode actuating circuit for the other channel at switch A$xy$ or B$xy$, as already described. Also, operation of primary relay A or B completes an operating circuit for the secondary relay C or D of the active channel. That operating circuit for relay C of channel I extends from ground via line 619, the relay coil C$q$, the line 618, switch A'$zy$, the line 615, switch B$yx$, line 612, switch A'$vw$, and line 614 to +. The corresponding operating circuit for secondary relay D is from ground via the relay coil D$q$, the line 620, switch B'$zy$, line 615, switch A$yx$, line 613, switch B'$vw$ and line 614 to +. A parallel circuit from line 615 to + via switch E$zy$ and line 616 is provided so long as relay E is idle. That connection forms part of the described actuating cathode circuits of gas tubes V3 and V4, and is not essential to operation of secondary relays C and D.

Operation of secondary relay C or D performs four distinct functions, two of which in the present embodiment are independent of the condition of selector switches S and T, and two of which are conditioned upon operation of one or other of those switches.

Firstly, secondary relay operation energizes either solenoid winding 400 or solenoid winding 402, depending upon whether selector switch S or T has been operated. Switch contact s of relay C is connected directly to + via line 625. Hence, operation of relay C connects the line 638 to + via switch C'ts, and thereby either operates relay J via switch S'st and the line 640 (if S is operated); or operates relay K via switch T'st and the line 641 (if T is operated). Contact s of relay D might be connected directly to + via line 625 (like the corresponding contact of relay C). However, the connection shown from Ds to + via line 628, switch Crs and line 625 is functionally equivalent since switch Crs is closed whenever relay D is operated, and reduces the number of switch armatures required on relay D. With Ds thus connected to +, operation of relay D (C being idle) connects the line 643 to + via D'ts and Crs, and thereby either operates relay K via switch S'wx and line 641 (if S is operated); or operates relay J via switch T'wx and line 640, if T is operated). Operation of relay J or K immediately energizes the corresponding solenoid driving winding 400 or 402 by means of power from any suitable source, shown as the battery 542, supplied via the lines 635 and 636. Armature 382 and actuating rod 384 are thereby driven upward toward limit switch G or downward toward limit switch H. That armature movement causes engagement of the clutch mechanism, driving the grader blade drive mechanism in the manner already described. The limit switches G and H are preferably arranged to be operated substantially simultaneously with, or shortly after, actual engagement of that drive mechanism.

Secondly, secondary relay operation closes a holding circuit for the relay itself via the normally closed armature limit switch Gyz or Hyz, which will presently be opened as a result of solenoid actuation and armature movement. That holding circuit prevents release of the secondary relay, regardless of the condition of the primary relay A or B, until the solenoid armature has moved far enough to open the limit switch. As soon as that limit switch has been operated, the holding circuit is opened and control of the secondary relay is returned to the primary relay of the channel.

Each holding circuit includes two parallel-connected normally closed switches associated with switch assemblies S and T, respectively. An equivalent function could be obtained in a more conventional manner with normally open switches. However, the illustrated method of connection is convenient and reduces the required total number of switch armatures for selector switches S and T. Specifically, in the present embodiment the holding circuit for secondary relay C of channel I leads from grounded line 619 through relay winding Cq and then via switch C'zy to the line 630. Two parallel circuits lead from line 630 to +. One leads via selector switch Suv, the line 631, limit switch Hyz and the line 633 to +; the other via selector switch Tuv, the line 632, limit switch Gyz and line 633 to +. When switch T is operated, the first of those circuits is effective; when switch S is operated, the second circuit is effective. In each instance, relay C is held (independently of its initial actuating circuit via switch A'yz) until the limit switch G or H is operated by armature rod 384. The corresponding holding circuit for relay D of channel II leads from grounded line 619 through relay winding Dq and switch D'zy to the line 637; then either via selector switch Tyz, line 631, and limit switch Hyz to line 633 and + (when selector switch S is operated); or via selector switch Syz, line 632, and limit switch Gyz to line 633 and + (when selector switch T is operated).

Thirdly, secondary relay operation in either channel reduces the effective sensitivity of response of that channel to the signal at 604. As illustrated, the desensitizing circuit connects the grid of the gas tube V3 or V4 via a resistance to a relatively negative potential, taken as ground. The series resistance is preferably variable to control the degree of desensitization produced. That desensitization of the system is performed in the present embodiment directly by the actuated secondary relay, but may be performed alternatively via any of the control mechanism between that relay and the driven tool. In channel I the desensitizing circuit leads from the grid of V3 via the variable resistance R26, the line 622, switch C'uv, and line 619 to ground. The corresponding circuit in channel II leads from the grid of V4 via variable resistance R27, the line 623, switch D'uv, and line 619 to ground. Closure of the desensitizing circuit in either channel raises the critical signal amplitude required to maintain periodic firing of the gas tube on subsequent half cycles of plate energization. So long as the degree of unbalance of bridge 580 is sufficient to maintain the signal at 604 greater than that increased critical value, the gas tube continues to fire every half cycle, and the desensitizing circuit does not affect operation of the system. However, if the signal at 604 falls below that increased critical value, the gas tube in the active channel ceases to fire. The primary relay A or B of the active channel is thereby idled. However, the secondary relay C or D remains operated via the holding circuit already described until that circuit is opened at limit switch Gyz or Hyz, insuring at least momentary engagement of the blade driving mechanism each time one of the channels is activated. As will be pointed out more fully, the desensitizing means may act upon the control system at any convenient point ahead of the discriminating means, represented in the present embodiment by gas tubes V3 and V4. It may, for example, involve a feedback loop having variable properties, but is clearly distinct from an ordinary servo loop because of that variation.

Fourthly, secondary relay operation closes an operating circuit for timing relay E. In channel I that operating circuit extends from + via the line 625, switch C'xw, the line 626 and relay winding Eq to ground. In channel II the circuit is the same except that switch D'xw replaces switch C'xw, those two switches being connected in parallel.

Operation of relay E opens the connection between line 615 and + at switch Eyz, disabling the described actuating cathode circuits for gas tubes V3 and V4. That does not prevent tube operation so long as the described holding cathode circuit remains closed by operation of relay A or B; but once those relays are both idled, neither tube can fire again until relay E returns to idle condition.

Operation of timing relay E also opens switch Evw, disconnecting one terminal of the capacitor C19 from its charging circuit via line 616 to +; and connects that capacitor instead to + via switch E'wx and line 626, which forms part of the described operating circuit for relay E. The other terminal of C19 is connected to ground via the resistance R32, which is preferably adjustable, as indicated. The described transfer of capacitor C19 from line 616 to line 626 maintains the charge on the capacitor so long as line 626 remains connected to + via the operated secondary relay C or D. When that relay is idled, however, capacitor C19 discharges via R32 and the relay coil Eq, maintaining relay E operated for a definite time period which is variable by adjustment of R32. That time is made sufficient to permit all transient voltages that may result from operation of the system to substantially disappear before relay E is idled. Such voltages are thereby prevented from producing spurious firing of either gas tube V3 or V4.

Timing relay F is operated directly by closure of the normally open switch G'wx or H'wx of whichever limit switch is operated by movement of solenoid armature rod 384. Those two switches are connected in parallel between line 633, which leads to +, and the line 645, which leads to one side of relay coil Fq, the other side being grounded. Closure of F'yz upon operation of relay F prepares a circuit for energizing centering solenoid winding 404 via power relay L. That circuit leads from ground through relay winding L*q* and via the line 646, switch F'*yz*, the line 647, switch D*rs*, line 628, switch C*rs* and line 625 to +. That circuit remains open unless both secondary relays C and D are idle. Hence, in practice, centering solenoid winding 404 is energized only after the solenoid driving winding 400 or 402 has been de-energized via power relay J or K upon idling of secondary relay C or D.

Centering solenoid winding 404 then remains energized until relay F releases. That occurs at a definite time following the release by armature rod 384 of the operated limit switch G or H. That time period may be determined in any suitable manner. For example, release of relay F may be delayed for a desired period by providing a copper slug, indicated schematically at 649, adjacent the magnetic armature of relay F. The delay in release of relay F is adjusted to maintain current in centering winding 404 until actuator 380 has returned to its normal intermediate position and has come to rest. The time required may vary considerably with the detailed design of the solenoid structure. An illustrative time period from release of the limit switch to de-energization of coil 404 is about 200 miliseconds. It has been found that the described arrangement prevents oscillations of the armature from causing opposite clutch engagement, and permits the armature to be fully returned to idle position and released more rapidly than if resilient means such as a spring are exclusively relied upon for that purpose.

System operation

Typical operation of the described illustrative electrical system is as follows. Selector switch handle 500 will be assumed for definiteness in position 502 (Fig. 14), with switch S operated for automatic drive of left hand blade control mechanism 70. If the actual grade angle of te blade corresponds to the desired angle set at dial 585 (Figs. 21 and 22) bridge circuit 580 is balanced, and zero input signal is supplied via transformer T2 to amplifier 600. With zero output signal at 604, the grids of both gas tubes V3 and V4 are held a ground potential by vibrator 550, cutting off the tubes. All relays A, B, C, D, E and F, and power relays J, K and L are then idle.

If the operator now shifts right blade control handle 89 toward him to drive the right hand end of blade 60 upward, that blade movement is transmitted via mechanical linkage 110 to potentiometer shaft 210, shifting brush 251 along winding 254 (Fig. 12). That action corresponds in Fig. 22 to movement of potentiometer R1, unbalancing the bridge. The resulting error signal is amplified and appears as a square wave at 604 in such phase that vibrator 550 grounds the negative-going wave transmitted by C5 and the positive-going wave transmitted by C6. The ungrounded wave in each instance is averaged by filter 606. The grid potential of V3 rises rapidly above cut-off, causing the tube to fire on the first following half cycle of plate energization. The resulting plate current, aided by action of C11 and R24, operates relay A. That isolates tube V4 at open switch A*xy*, so that it cannot be fired by supurious transient voltages; and operates relay C.

Closure of switch C'*st* operates power relay J via switch S'*st*, energizing solenoid winding 400 and moving armature 382 upward. Closure of switch C'*wx* operates timing relay E. Closure of switch C'*yz* closes a holding circuit for relay C via limit switch G*yz*. Closure of switch C'*uv* desensitizes gas tube V3, causing it to cease firing on alternate half cycles unless the error signal at 604 has increased fast enough to maintain the grid of V3 above cut-off in spite of the desensitizing action.

If, for example, the operator gives handle 88 a rapid jab, returning it promptly to neutral position, the resulting blade movement may cause only a minimum error signal at 604, typically corresponding to movement of the brush of potentiometer R1 between two adjacent turns of the winding in the case of a wire-wound potentiometer. With such a minimum signal, the system is typically actuated as just described; but tube V3 ceases to fire as soon as the desensitizing circuit is closed. Relay A is then idled, but relay C is held operated via its holding circuit until that circuit is opened at limit switch G*yz* upon operation of that switch by solenoid armature 382. The subsequent action under that condition will be described below.

If, for example, the operator holds handle 88 in operating position, driving the right-hand end of the blade up continuously at a definite speed, the error signal at 604 typically increases at such a rate that, by the time relay C closes the desensitizing circuit, the existing error signal exceeds the increased critical value and hence is sufficient to maintain the grid of V3 above cut-off in spite of that circuit. Under that condtion, tube V3 continues to fire every half cycle, holding relay A in.

Armature 382 is then driven to the upper end of its travel, engaging the left blade drive. Operation of limit switch G, which may occur, for example, approximately 50 milliseconds after solenoid energization, opens the holding circuit for relay C at switch G*yx*, returning relay C to exclusive control by relay A. Operation of limit switch G also operates timing relay F, preparing the actuating circuit for centering solenoid winding 404.

The system continues in the described driving condition as long as the error signal exceeds the increased critical value. In that condition, relays A, C, E and F and power relay J are operated and the left-hand blade drive is engaged and is driving the blade upward positively at full speed. Since the manually controlled right blade drive and the automatically controlled left blade drive typically operate at approximately equal speeds, the blade tends to be lifted continuously (as long as the manual drive is engaged) at a grade angle that remains a close approximation to the desired grade angle. The departure from that angle during such drive is typically slightly greater than is required to produce an error signal at 604 that exceeds the described increased critical value.

If the operator now returns the right control handle 88 to neutral, the left blade drive continues to operate for a fraction of a second, rapidly restoring the grade angle toward the desired value and reducing the error signal at 604. Aided by the desensitizing circuit, the grid of V3 rapidly drops below cut-off, idling relay A. Relay C then releases, preferably after a short time delay, regulated by R30, releasing power relay J and de-energizing solenoid coil 400. Release of relay C also energizes centering coil 404 by closure of switch C*rs*, driving armature 382 rapidly toward neutral position. The left blade drive is thereby disengaged. As armature 382 returns to neutral position, limit switch G is released, opening the circuit via switch G'*wx* to relay coil F*q*. That relay releases, deenergizing centering coil 404, but only after a time sufficient to establish armature 382 in neutral position. If the blade has come to rest at substantially the desired grade angle, bridge 580 is effectively balanced and both gas tubes V3 and V4 remain biased beyond cut-off. The system is now restored to normal sensitivity by opening of relay switch C'*uv*. Hence, if the blade has stopped short of the desired grade angle, or if it has overshot that angle by a significant amount, the error signal at 604 is sufficient to raise the grid of either V3 or V4 above cut-off, depending upon the phase of the error signal. However, both tubes remain disabled until release of relay E, which holds their cathode circuits open at E*yz*. As already explained, relay E is timed to release only after a sufficient settling time to permit all transient voltages in the system to decay. That settling time varies greatly with the detailed design of the system. In a system designed for compactness and economy it may be as long as 0.4 second, for example. That action of relay E and the described interlock which permits only one channel to operate at a time permit great economy in construction of the system, eliminating complex voltage stabilizing devices that would otherwise be required.

In the present example, following release of relay E, tube V3 will typically fire again, operating relays A, C, E, F and J and energizing solenoid coil 400 in the manner just described. However, since the error signal is now relatively small, desensitization of the system upon operation of relay C may immediately cause V3 to cease firing. Relay A is thereby released, and relay C is held only via limit switch $G_{yz}$.

Under that condition, control of the time during which the blade drive is held engaged is independent of the actual value of the error signal, and is controlled entirely by the characteristics of the system itself. As already explained, the holding circuit for relay C via limit switch $G_{yz}$ insures that solenoid coil 400 will actually cause engagement of the blade drive before being deenergized. And the further delay in release of relay C, typically adjustable at R30, permits accurate determination of the total resulting engagement time of the blade drive. It is particularly desirable to separate those two timing functions in a system in which the drive mechanism may behave irregularly in any respect. In the present system, for example, the drive clutch members (Fig. 16) may be in position to engage immediately; or the flat tops of their opposing teeth may initially abut each other, delaying engagement until their teeth become properly aligned. In the latter case, abutting relation of the teeth typically checks the solenoid armature movement short of the limit switch, so that relay C remains energized. Energization of the solenoid is thus maintained until the clutch teeth actually mesh, positively initiating blade drive. Although limit switch $G_{yz}$ then opens, the set time delay for release of relay C produces a definite minimum period of actual drive engagement that is substantially uniform and independent of the detailed meshing action of the clutch.

With the described system, the blade is driven rapidly toward the desired position until the deviation is less than a relatively coarse critical value; and is then driven in a succession of intermittent approach movements of predetermined magnitude until the deviation is less than a relatively fine critical value.

Fig. 24 is a schematic graph in which the solid line I represents the magnitude of the grade angle deviation, that is, the departure of the existing blade grade angle from the desired value, plotted as a function of time during a typical control operation. The dashed line III represents the effective sensitivity of the system, that is, the relatively fine critical value of the deviation that will just produce corrective action by causing tube V3 or V4 to fire. That critical value is adjustable, for example, at potentiometer R11 (Fig. 22). It typically corresponds, in the present embodiment, to a deviation of the blade from the desired grade angle equal to about 0.1 percent of slope, which amounts to about ⅛ inch at one end of a 10-foot blade. The dashed line IV in Fig. 24 represents the relatively coarse critical value of the deviation at which corrective action of the system is continuous rather than intermittent, that is, at which tube V3 or V4 continues to fire even though desensitized. That coarse critical value is adjustable by varying the degree of desensitization, as at variable resistances R26 and R27 in channels I and II, respectively (Figs. 22 and 23).

Assuming an initial error signal corresponding to the point $a$ in Fig. 24, and hence larger than the coarse cirtical value IV, the blade is driven continuously in a direction to reduce the deviation, as represented by line segment $ab$. During that action tube V3, say, fires continuously on every half cycle of energizing plate voltage in spite of desensitization by closure of $C'_{uv}$. As soon as the deviation becomes less than the coarse critical value IV, the tube ceases to fire, bringing the blade to a stop shortly afterward at $b$, as already described. The vertical distance from line IV to point $b$ is determined largely by the release delay time of relays C and D, adjustable at R30 and R31 in the respective channels.

If point $b$ corresponds to a grade angle deviation greater than the fine critical value III, the blade remains stationary only for a short period, represented in Fig. 24 by the line segment $bc$. That time period is determined primarily by the release delay time of relay E, which disables both channels at open $E_{yz}$, and is adjustable as at R32 (Figs. 22 and 23). Upon idling of relay E, control is returned to tubes V3 and V4, now operating at full sensitivity. Hence a second tool drive cycle takes place, as represented by the line segment $cb'$, provided the grade angle deviation exceeds the fine critical value III. However, initiation of that drive immediately desensitizes the system, bringing the tool movement to a halt at $b'$ after a travel which is determined primarily by the release delay time of relays C and D, adjustable at R30 and R31 as already explained. Such intermittent tool drive actions are repeated until the tool comes to rest, as indicated at $d$ in Fig. 24, at a position where the grade angle deviation is less than the fine critical value III. The system then remains idle until that value is again exceeded.

The effective duration of each discrete approach movement is preferably adjusted to drive the blade through an angle approximately equal to twice the fine critical value of the deviation, that is, twice the desired angular accuracy of the system. That produces a satisfactorily rapid approach to the desired value, while insuring that the blade will only occasionally be driven beyond the desired position by a sufficient angle to require a cycle of reverse drive.

The described series of intermittent approach movements has the effect of moving the blade at an average rate that is appreciably less than the continuous drive speed. Hence, when a large correction is to be made, the blade drives at full speed until the error is less than the definite coarse critical value, and then approaches the final equilibrium position at a slower rate. The present type of control thus simulates the so-called proportional or rate-of-approach control of some servo systems, whereby the rate of drive is caused to decrease in proportion to the decreasing error, as schematically shown by curve II in Fig. 24. The present system, however, accomplishes a corresponding function with a drive mechanism that operates at a set speed and is always either fully engaged or fully disengaged.

In systems in which drive engagement is subject to little or no time variation, or if uniformity of actual drive time on all drive impulses is not required, it may be preferred to omit the described circuitry for insuring energization of the solenoid driving winding until the drive mechanism is actually engaged. In the present embodiment, that circuitry includes the normally closed limit switches $G_{yz}$ and $H_{yz}$, relay holding switches $C_{yz}$ and $D_{yz}$, and the four reversing switches $S_{uv}$, $S_{yz}$, $T_{uv}$ and $T_{yz}$. With that simplification, the actual period of drive when the error signal is small is still variable by adjustment of the release time of relays C and D, as by variation of R30 and R31. The metered portion of the drive time is then in effect measured from the release of relay A or B (which opens the winding of C or D), rather than from the time of actual drive engagement, as in the preferred embodiment.

If it is desired to omit also the normally open limit switches $G_{wx}$ and $H_{wx}$, through which relay F is energized in the present embodiment, relay F may be controlled directly by relays C and D. For example, line 645 from relay winding $F_q$ may be connected directly to line 626, through which relay E is energized from relays C and D. With the particular time delay mechanism shown for relay E, capacitance C19 must then be prevented from discharging through relay winding $F_q$ in parallel with $E_q$, as may be done, for example, by inserting a suitably oriented rectifying element in line 626 between the point at which line 645 is connected to it and the junction 652 between Eq and Ex. With that alternative energizing circuit, relay F is actuated upon closure of relay C or D, preparing the described energizing circuit for centering coil relay L. Release of C or D energizes that circuit and also opens the winding of timing relay F. After its set delay time, relay F releases, ending the set period of energization of solenoid centering winding 404.

Figure 25:
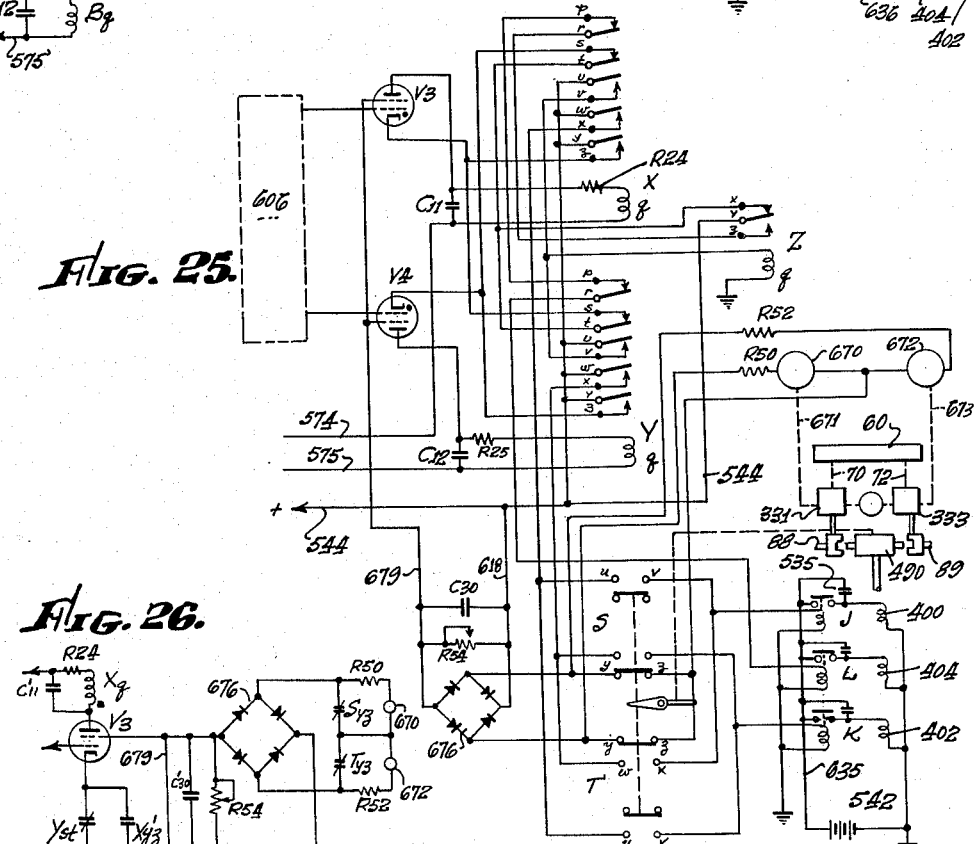
Fig. 25 is a schematic diagram corresponding to a portion of Fig. 22 and representing a modification.
Figure 26:
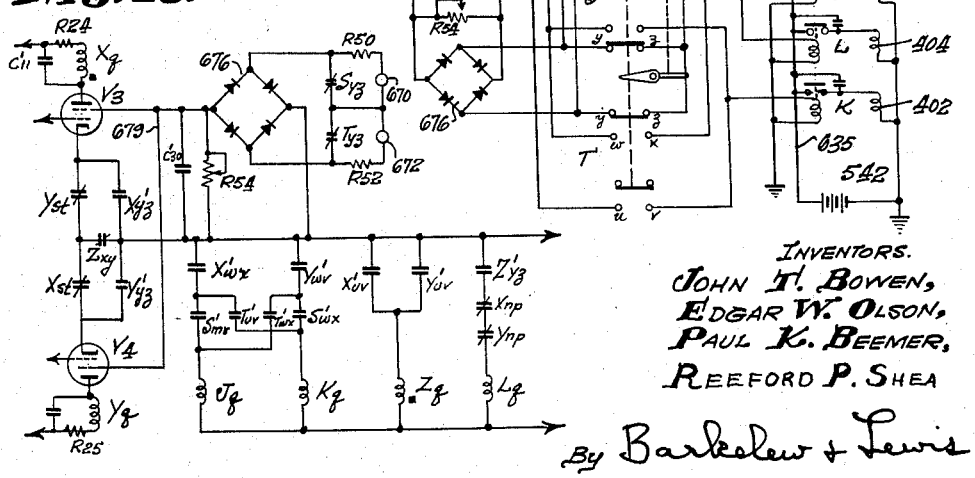
Fig. 26 is a functional schematic diagram corresponding to Fig. 25.

A modified embodiment of the timing and control system is represented in Figs. 25 and 26. The remainder of the modified system may be as already described and illustrated. Many elements of the modified system correspond closely to the previous system, are generally identified by the same numerals and require no further description.

In the system of Figs. 25 and 26, part of the control action is derived from actual movement of the tool drive mechanism itself. The clutch mechanism, or its equivalent, of the actual tool drive, which may be the regular manual drive of an existing machine and may be positive in its operation, thus becomes a part of the servo control system.

For that purpose a control signal may be derived from movement of the actual tool drive in any suitable manner. For example, many types of electrical and magnetic transducers are known for producing an electrical signal such as a voltage signal in response to shaft rotation or other mechanical movement. Two such transducers are indicated schematically at 670 and 672 in Figs. 25 and 26, responsive to engagement of clutch mechanisms 331 and 333, respectively, of the left and right drawbar lift drives 70 and 72 of the present illustrative machine. Those transducers may typically comprise electromagnetic alternators of known type coupled directly to output shafts 330 (Fig. 16) of those clutch mechanisms as indicated by the dashed lines 671 and 673. Those alternators produce an alternating current voltage in response to shaft rotation in either direction. Means are provided for normally disabling those signals and for rendering effective only the signal derived from the drive mechanism that is under automatic control. As illustratively shown, the alternators 670 and 672 are connected in series with each other and with the resistances R50 and R52, respectively, and each alternator and its resistance are shunted via a normally closed switch. Those switches are the normally closed switches Syz and Tyz, under control of selector lever 500. When that lever is moved from neutral position to put one or other of the blade drive mechanisms under automatic control, the alternator of that drive is rendered effective by opening of its shunting circuit, the other alternator remaining disabled by its shunt circuit.

The alternator output is supplied to a full-wave rectifier, indicated schematically at 676, the positive output terminal of which is connected via line 678 to the positive supply line 544 of the system. The negative output terminal of rectifier 676 is connected via the line 679 to the shield grids of both gas tubes V3 and V4. Rectifier 676 is preferably shunted by a capacitor C30 and a variable resistance R54, connected in parallel, which smooth the direct current produced. With both alternators shorted out, tubes V3 and V4 act normally, with the tube shield grids effectively tied to the respective cathodes. The system then responds to an error signal with full sensitivity in the manner already explained. With either alternator effective and driven, a negative bias is supplied to the shield grids of both tubes, increasing the threshold signal required at their control grids to fire the tubes, and effectively desensitizing the system. That action is effective only on the tube in the active channel, since the other tube is locked out by opening of its cathode circuit. The degree of desensitization is variable, for example, by variation of R54.

With that general type of desensitizing action, the mechanical clutches 331 and 333 of the blade positioning mechanism may be considered as a part of the desensitizing control loop, and desensitization can occur only after actual clutch engagement. Any delay in clutch engagement, as by failure of the clutch teeth to mesh immediately, causes a corresponding delay in desensitization. Hence, once a tube fires, initiating control action, it typically continues to fire until that control action actually occurs. The duration of actual drive engagement is thereby rendered independent of any delay in clutch engagement, a function which was provided in the previously described system by means of secondary relays C and D and their holding circuits via the limit switches G and H. In the present system those limit switches may be omitted, and the remaining functions of the primary and secondary relays of the previous system may be combined, for each channel, in a single relay. The latter relays are designated X and Y in Figs. 25 and 26. They are operated under control of gas tubes V3 and V4, respectively, as were primary relays A and B of the previous systems. Solenoid control relays J and K are controlled by relays X and Y via selection switches S and T in substantially the manner already described for their control by relays C and D of the previous system.

The functions performed by relays E and F of the previous system are combined in the present system in a single relay designated Z. Those functions are timing the period during which the system is disabled, as by isolation of the gas tube cathodes, during decay of transients; and timing energization of centering solenoid winding 404 via relay L. Relay Z is operated in a manner corresponding to operation of relay E in the previous system, namely, upon closure of either switch X'uv or Y'uv. Release of relay Z is delayed by any suitable means, indicated at 681 as a copper slug coil, for a time corresponding generally to the described delay time of relay E. Relay switch Zxy corresponds fully to switch Eyz of the previous system, and opens the cathode actuating circuit of the gas tubes whenever relay Z is actuated, a holding cathode circuit being provided via X'yz and Y'yz for the respective tubes so long as the latter fire continuously. Relay switch Z'yz is connected, like switch F'yz of the previous system, in the energizing circuit for centering coil relay L. That circuit includes in series the normally open relay switches Xrp and Yrp. Hence the centering coil is energized only during the release delay time of relay Z, during which period relay Z is still actuated but relays X and Y are both idle. By thus timing the centering coil by the same relay Z which times disabling of the system after each action, one or other of those time periods may be longer than is otherwise necessary, but that is often little disadvantage and may be acceptable in view of the economy involved.

We claim:

1. In a control system for the blade of a grading machine that has a normal direction of travel and that comprises a machine frame, a draw-bar rotatably mounted with respect to the machine frame, and a circle frame rotatably mounted with respect to the draw-bar and carrying the blade; the combination of a sub-frame, a member mounted on the sub-frame for rotation about a member axis, mounting means for supporting the sub-frame with respect to the machine frame, said mounting means including mechanism for continuously varying the orientation of the supported sub-frame with respect to the machine frame to align the member axis with the direction of travel of the machine, and means for releasably locking the sub-frame in aligned position, driving means connected between the member and the circle frame to drive the member about the member axis under control of rotational movement of the blade about the direction of travel of the grading machine, and means acting to produce a signal responsive to rotation of the member.

2. In a control system for the blade of a grading machine that has a normal direction of travel and that comprises a machine frame, a draw-bar rotatably mounted with respect to the machine frame, and a circle frame rotatably mounted with respect to the draw-bar and carrying the blade; the combination of a sub-frame, a member mounted on the sub-frame for rotation about a member axis, a pendulum pivotally mounted on the sub-frame on a pendulum axis parallel to the member axis, signal means mounted on the sub-frame and actuable in response to mutual rotation of the member and the pendulum, mounting means for supporting the sub-frame on the machine frame with the member axis accurately fixed parallel to the direction of travel of the grading machine, and driving means adapted to be connected between the member and the circle frame to drive the member about the member axis under control of rotational movement of the blade about the direction of travel of the grading machine.

3. In a control system for the blade of a grading machine that comprises a machine frame, a draw-bar rotatably mounted with respect to the machine frame, and a circle frame mounted with respect to the draw-bar for relative rotation about a circle axis and carrying the blade; the combination of a member mounted with respect to the machine frame for rotation about a member axis, driving means connected between the member and the circle frame for driving the member in a definite rotational relation to the movement of the blade, said driving means comprising a coupling member rotatably mounted on the circle frame coaxially with the circle axis, and means for releasably locking the coupling member to the circle frame in a predetermined rotational relation, and means acting to produce a signal responsive to rotation of the first mentioned member.

4. In a control system for the blade of a grading machine that comprises a machine frame, a draw-bar rotatably mounted with respect to the machine frame, and a circle frame mounted with respect to the draw-bar for relative rotation about a circle axis and carrying the blade; the combination of a member mounted with respect to the machine frame for rotation about a member axis, driving means releasably connected between the member and the circle frame for driving the member in a definite rotational relation to the movement of the blade, said driving means being operative only within a limited range of circle frame rotation, stop means normally acting between the circle frame and the drawbar to prevent circle frame rotation beyond said range, unitary control means actuable to disable the stop means and to release the driving means, and means acting to produce a signal responsive to rotation of the member.

5. In a control system for the blade of a grading machine that comprises a machine frame, a draw-bar rotatably mounted at the forward end of the machine frame and extending rearwardly therebelow, a circle frame rotatably mounted upon the rearward portion of the draw-bar and carrying the blade, and a driving connection for the circle comprising a drive shaft extending between the draw-bar and the machine frame; the combination of a member rotatably mounted on the machine frame above the draw-bar, driving means connected between the member and the circle frame for driving the member in a definite rotational relation to the movement of the blade, said driving means including apertured linkage means spacedly surrounding the said drive shaft in all normal working positions of the draw-bar, and means acting to produce a signal responsive to rotation of the member.

6. The combination defined in claim 5, and in which the apertured linkage means comprise a rigid elongated link member having two transversely spaced legs which spacedly surround the drive shaft.

7. The combination defined in claim 5, and in which the apertured linkage means comprise a rigid elongated link member having two hollow transversely spaced legs which spacedly surround the drive shaft, coupling members rotatably mounted at the respective ends of the link member on mutually parallel axes, and drive means within the hollow legs for maintaining the coupling members in mutually parallel rotational relation.

8. In a control system for the blade of a grading machine that comprises a machine frame, a draw-bar rotatably mounted with respect to the machine frame, and a circle frame rotatably mounted with respect to the draw-bar and carrying the blade; the combination of a pendulum mounted for pivotal movement about a pendulum axis which is fixed with respect to the machine frame, damping means interposed between the pendulum and the machine frame and acting independently of blade movements to damp random oscillation of the pendulum with respect to the machine frame, and means acting to produce a signal responsive to differential rotary movement of the blade and the pendulum.

9. In a control system for the blade of a grading machine that has a normal direction of travel and that comprises a machine frame, a draw-bar rotatably mounted with respect to the machine frame, and a circle frame rotatably mounted with respect to the draw-bar and carrying the blade; the combination of a pendulum mounted for pivotal movement about a pendulum axis which is parallel to the direction of travel of the grading machine, structure forming a housing enclosing the pendulum and rotationally fixed with respect to the machine frame, damping means acting between the pendulum and the housing to damp random mutual oscillations thereof, a member mounted for rotation about a member axis parallel to the direction of travel, driving means connected between the blade and the member, and means acting to produce a signal responsive to differential rotation of the pendulum and the member.

10. A differential pendulum assembly comprising housing structure forming two adjacent chambers separated by an apertured partition, a shaft journaled with respect to the housing structure and extending in spaced relation through the aperture in the partition, a hub sleeve journaled coaxially on the shaft and extending through the aperture in the partition, an inertial mass fixedly mounted eccentrically on the hub sleeve in one of the housing chambers and forming a pendulum, an electrical transducer comprising two elements mounted in the other housing chamber on the shaft and on the hub sleeve, respectively, and responsive to relative rotation thereof, and means for driving the shaft from outside the housing.

11. A differential pendulum assembly comprising housing structure forming two adjacent chambers separated by an apertured partition and surrounded by an outer wall, a shaft journaled with respect to the housing structure and extending in spaced relation through the aperture in the partition, one end of the shaft projecting in sealed relation through a bore in the outer wall, a hub sleeve journaled coaxially on the shaft and extending through the aperture in the partition, an inertial mass of sector form fixedly mounted on the hub sleeve in one of the housing chambers with the sector axis coaxial of the shaft, the walls of that chamber being closely spaced from the axial and peripheral faces of the mass, an electrical transducer comprising two elements mounted in the other housing chamber on the shaft and on the hub sleeve, respectively, and responsive to relative rotation thereof, and a damping fluid in said one chamber filling the space between the mass and the chamber walls.

12. A control system for an earth-working machine which comprises a vehicle frame, a tool carrier adapted to carry an earth-working tool, structure supporting the tool carrier at two spaced points thereof for essentially independent movements with respect to the vehicle frame, respective driving means for the said movements and respective control elements movable to actuate said driving means; said control system comprising in combination a single armature element, electrical circuit means energizable to drive the armature element in a predetermined direction, selective coupling mechanism connectible between the armature element and the said control elements and capable of two alternative driving positions, the selective coupling mechanism in one position providing a driving connection between the armature element and one control element and in the other position providing a driving connection between the armature element and the other control element, means for shifting the selective coupling mechanism between its two driving positions, sensing means responsive to departure of the tool carrier from a predetermined position, and control means for energizing the electrical circuit means under control of the sensing means.

13. A control system as defined in claim 12 and including also means for disabling the electrical circuit means when the selective coupling mechanism is intermediate its said driving positions.

14. A control system for an earth-working machine which comprises a vehicle frame, a tool carrier adapted to carry an earth-working tool, structure supporting the tool carrier at two spaced points thereof for essentially independent movements with respect to the vehicle frame, and respective driving means for the said movements; said control system comprising in combination a continuously driven power shaft, individual clutch mechanisms manually actuable to supply power from the power shaft selectively to the respective driving means, a single armature element, electrical circuit means energizable to drive the armature element in a predetermined direction, selective coupling mechanism connectible between the armature element and the clutch mechanisms and capable of two alternative driving positions, the selective coupling mechanism in one position providing a driving connection between the armature element and one clutch mechanism and in the other position providing a driving connection between the armature element and the other clutch mechanisms, means for shifting the selective coupling mechanism between its two driving positions, sensing means responsive to departure of the tool carrier from a predetermined position, and control means for energizing the electrical circuit means under control of the sensing means.

15. A control system for an earth-working machine which comprises a vehicle frame, a tool carrier adapted to carry an earth-working tool, structure supporting the tool carrier at two spaced points thereof for essentially independent movements with respect to the vehicle frame, and respective driving means for the said movements; said control system comprising in combination a continuously driven power shaft, individual clutch mechanisms manually actuable to supply power from the power shaft selectively to the respective driving means, each clutch mechanism being actuable selectively in forward and rearward driving directions, armature means having a normal position, first and second circuit means energizable to drive the armature means from normal position in respective first and second directions, selective coupling mechanism connectible between the armature means and the clutch mechanisms and capable of two alternative driving positions in which it provides a driving connection between the armature and the respective clutch mechanisms, sensing means responsive to departure of the tool carrier in respective first and second directions from a predetermined position, and control means for selectively energizing the first and second circuit means under control of the sensing means.

16. A control system as defined in claim 15 and in which the said control means includes switch means shiftable between first and second operating positions with the selective coupling mechanism, the control means energizing the first and second circuit means in response to tool carrier departures in the first and second directions, respectively, when the switch means is in one operating position, and the control means energizing the said circuit means in response to tool carrier departures in the second and first directions, respectively, when the switch means is in the other operating position.

17. A control system for an earth-working machine which comprises a vehicle frame, a tool carrier adapted to carry an earth-working tool, structure mounting the tool carrier at two spaced points thereof for essentially independent movements with respect to the vehicle frame, respective driving means for the said movements and respective control elements movable in two directions to actuate said drive means selectively in forward and reverse driving directions; said control system comprising in combination armature means having a normal position, first and second circuit means energizable in response to a control signal to drive the armature means from normal position in respective first and second directions, selective coupling mechanism operatively connected to the armature means and having a neutral position and being shiftable from neutral position in two alternative directions to drivingly engage the respective control elements, sensing means responsive to departure of the tool carrier in respective first and second directions from a predetermined position and developing corresponding first and second signals, switching means for supplying said signals as control signals to said circuit means, the switching means having a neutral position and having two operating positions which correspond to the respective operating positions of the selective coupling means, and control means manually operable to shift the switching means to its respective operating positions only after the selective coupling means is engaged with the corresponding control element.

18. A control system for an earth-working machine which comprises a vehicle frame, a tool carrier adapted to carry an earth-working tool, structure mounting the tool carrier for movement with respect to the vehicle frame, driving means for the tool movement, a continuously driven power shaft, clutch means actuable to supply power from the power shaft to the driving means, and a manually operable control handle operatively connected to said clutch means for manual actuation thereof; said control system comprising in combination sensing means responsive to departure of the tool carrier from a predetermined position, a movably mounted actuating member, electrical control means for moving the actuating member under control of the sensing means, and mechanical linkage means engageable between the actuating member and the manually operable control handle for automatic actuation of the clutch means.

19. A control system as defined in claim 18 and in which the mechanical linkage means includes yielding means permitting movement of the control handle irrespective of the position of the actuating member.

20. A control system as defined in claim 18 and in which the mechanical linkage means includes a resilient element that is distortible only in response to a force that exceeds a predetermined critical value, said critical value corresponding to a force at the manual control handle that exceeds the force required for normal handle operation and is less than can conveniently be manually exerted thereon, distortion of said element permitting movement of the control handle irrespective of the position of the actuating member.

21. In combination with a grading machine which comprises a machine frame, an earth-working blade mounted with respect to the frame for relative angular movements about two non-parallel axes, respective driving means for the tool movements, an operator's cab mounted on the machine frame, structure forming a clutch housing mounted at the front of the operator's cab and intermediate its width and having a top wall and a side wall, a continuously driven power shaft, two clutch means within the clutch housing actuable to supply power from the power shaft to actuate the respective driving means, and two manually operable control handles extending above the top wall of the clutch housing and spaced transversely of the machine, said handles being operatively connected to the respective clutch means for manual actuation thereof; a control system for the blade movement comprising in combination two shafts rotatably mounted in mutually parallel relation above the top wall of the clutch housing and extending transversely of the machine, structure operatively connecting the shafts to the respective manual handles, actuator means movably mounted adjacent one side wall of the clutch housing, electrical control means for causing movement of the actuator means in response to departure of the blade from a predetermined position and means manually operable to two alternative operating positions in which the actuator means is operatively connected to the respective shafts.

22. In a control system for the blade of a grading machine, the combination of structure forming two electrical impedances, means for varying the ratio of the impedances in accordance with the grade angle of the blade, a potentiometer comprising a third impedance tapped at two points equidistant from its respective ends, a fourth impedance connected between said taps, and brush means engaging the third impedance and manually movable longitudinally thereof, the first and second impedances and the portions of the potentiometer on the two sides of the brush means being connected in a bridge network, drive means actuable to vary the grade angle of the blade, means for actuating the drive means in response to bridge unbalance in a direction to restore bridge balance, and indicating means for indicating the position of the potentiometer brush and comprising an indicator and a scale mounted for mutual movement and means acting to move the indicator relative to the scale in accordance with the brush movement, the scale being calibrated directly in terms of grade angle and comprising a relatively expanded central portion corresponding to the central shunted portion of the third impedance, and relatively compressed end portions corresponding to the unshunted end portions of the third impedance.

23. In a control system for a vehicle-mounted earth working tool that is mounted on a vehicle frame for relative angular movement about at least one axis of tool movement; means for developing a signal that represents the angular position of the tool about a second axis that is oblique with respect to the axis of tool movement, said means comprising the combination of a member mounted for rotation about a member axis that is fixed in direction with respect to the vehicle frame and parallel to said second axis, means responsive to angular tool movement and acting to derive the rotational component thereof about the member axis, means acting to drive the member through an angle equal to that rotational component, and means acting to produce a signal responsive to the angular position of the member.

24. The combination defined in claim 23 and wherein the vehicle has a normal direction of travel and the said second axis and the member axis are parallel to the direction of travel.

25. In a control system for an earth working tool carried on a vehicle frame, the tool being angularly adjustable with reference to the vehicle frame in at least one plane of tool movement, the combination of a member mounted for angular movement in a second plane that is fixed with respect to the vehicle frame and oblique with respect to said plane of tool movement, means connected between the tool and the member for transmitting to the member only that component of the angular tool movement that lies in the second plane, means acting to define a reference direction in the second plane, and means acting to produce a signal responsive to variations in the angular position of the member with respect to the reference direction.

26. The combination defined in claim 25 and wherein said reference direction is substantially the direction of gravity.

27. The combination defined in claim 25 and including power means actuable to drive the tool movement and means for actuating the power means under control of the signal.

28. In a control system for a vehicle-mounted earth working tool that has a critical tool direction and is mounted on a vehicle frame for relative angular movement about at least one axis of tool movement; means for developing a signal that represents the angular position of the critical tool direction about a second axis that is oblique with respect to the axis of tool movement, said means comprising the combination of a member mounted for rotation about a member axis that is fixed in direction and parallel to said second axis, structure carried by the member and acting to define a plane that is fixed with relation to the member and parallel to the member axis, driving means for driving the member under control of tool movement, said driving means acting to maintain said plane parallel to the critical tool direction, and means acting to produce a signal responsive to the angular position of the member.

29. In a control system for a vehicle-mounted earth working tool that has a critical tool direction and is mounted on a vehicle frame for relative angular movement about at least one axis of tool movement; means for developing a signal that represents the angular position of the critical tool direction about a second axis that is oblique with respect to the axis of tool movement, said means comprising the combination of a member mounted for rotation about a member axis that is parallel to said second axis, bracket means carried by the member for rotation with respect thereto about a bracket axis perpendicular to the member axis, structure on the bracket means defining a linkage axis perpendicular to the bracket axis, driving means connected between the tool and the bracket means and acting to maintain the linkage axis parallel to the critical tool direction, and means acting to produce a signal responsive to the angular position of the member.

30. In combination with a vehicle having a normal direction of travel and comprising a frame, a ground-working tool having a critical tool direction, and means mounting the tool with respect to the frame for relative rotation about a plurality of non-parallel axes; a system responsive to the orientation of the critical tool direction about the normal direction of travel of the vehicle, said system comprising a rigid elongated link member, coupling members pivotally related to the link member at its opposite ends on respective transverse coupling axes which are mutually parallel, structure mounted on the coupling members defining respective linkage axes that are perpendicular to the coupling axes, drive mechanism interconnecting the coupling members and acting to maintain their linkage axes mutually parallel, means rotatably mounting one of the coupling members with its linkage axis parallel to the critical tool direction, a bracket member mounted for rotational movement with respect to the frame about two mutually perpendicular bracket axes, one of said bracket axes being parallel to the direction of travel of the vehicle, means rotatably mounting the other coupling member on the bracket member with its linkage axis transverse of the bracket axes, and means for producing a signal responsive to the angular position of the bracket member about said one bracket axis.

31. A system as defined in claim 30, and in which at least one of said coupling member mounting means includes structure permitting translational movement of the coupling member in a direction transverse of its coupling axis.

32. In combination with a vehicle having a normal direction of travel and comprising a frame, a draw-bar mounted for angular movements about a longitudinal and a transverse axis with respect to the frame, a tool carrier mounted for angular movement about a generally vertical axis with respect to the draw-bar and adapted to carry a tool having a critical tool direction; means responsive to the orientation of the critical tool direction and comprising two rigid link members extending generally vertically and generally parallel to the direction of travel, respectively, means mounting one end of the vertical link member for pivotal movement with relation to the tool carrier on a first linkage axis parallel to the critical tool direction, coupling members pivotally related to the horizontal link member at its opposite ends on respective transverse coupling axes which are mutually parallel, structure mounted on the coupling members and defining respective linkage axes that are perpendicular to the coupling axes, drive means interconnecting the coupling members and acting to maintain their respective linkage axes mutually parallel, means rotatably mounting one of the coupling members on the other end of the vertical link member with the three said linkage axes mutually parallel, a bracket member mounted for rotational movement with respect to the frame about a plurality of non-parallel bracket axes, one of said bracket axes being parallel to the direction of travel of the vehicle, means rotatably mounting the other coupling member for pivotal movement with respect to the bracket member with the linkage axes perpendicular to the bracket axes, and means for producing a signal responsive to the angular position of the bracket member about said one bracket axis.

33. A control system for controlling the transverse grade angle of the blade of a grading machine that has a normal direction of travel and that comprises a machine frame, structure mounting the blade for angular movement with respect to the machine frame about at least one axis that is oblique with respect to the direction of travel, and power means actuable to drive the blade movement to vary the grade angle of the blade; said control system comprising the combination of a member mounted for rotation with respect to the machine frame about a member axis parallel to the direction of travel, means acting to drive the member rotation in accordance with the grade angle of the blade and independently of other components of blade movement, means for establishing the direction of gravity, and control means for actuating the power means in response to the angular position of said member relative to the direction of gravity.

34. A control system for controlling the transverse grade angle of the blade of a grading machine that has a normal direction of travel and that comprises a machine frame, structure mounting the blade for angular movement with respect to the machine frame about at least one axis that is oblique with respect to the direction of travel, and power means actuable to drive the blade movement to vary the grade angle of the blade; said control system comprising the combination of a member mounted for rotation with respect to the machine frame about a member axis parallel to the direction of travel, structure carried by the member and acting to define a plane that is fixed with relation to the member axis and parallel to the member axis, driving means for driving the member under control of the blade movement, said driving means acting to maintain said plane parallel to the blade edge, and control means for actuating the power means in response to the angular position of said member.

35. A control system for controlling the transverse grade angle of the blade of a grading machine that has a normal direction of travel and that comprises a machine frame, structure mounting the blade for angular movement with respect to the machine frame about at least one axis that is oblique with respect to the direction of travel, and power means actuable to drive the blade movement to vary the grade angle of the blade; said control system comprising the combination of a member mounted for rotation with respect to the machine frame about a member axis parallel to the direction of travel, means acting to drive the member rotation in accordance with the grade angle of the blade, sensing means responsive to the angle between the member and the direction of gravity and acting to develop a control signal which increases with the deviation of that angle from a predetermined value, control means for actuating the power means when the signal exceeds a predetermined critical value, and means acting to increase said critical value of the control signal in response to increase of the grade angle.

36. In a control system for the blade of a grading machine, the combination of sensing means responsive to the transverse grade angle of the blade and acting to develop an electrical signal that represents the magnitude and direction of the departure of the grade angle from a predetermined value independently of other components of blade movement, drive means actuable to vary the grade angle of the blade, a continuously driven power shaft, clutch means having releasably engageable clutch teeth for positively connecting the shaft to the drive means to actuate the latter, and electrical means for engaging the clutch means under control of the sensing means, said electrical means comprising first control means for engaging the clutch means when the signal represents a departure greater than a first critical magnitude, and second control means for then releasing the clutch means when the signal represents a departure less than a second critical magnitude which is greater than said first critical magnitude.

37. In a control system for the blade of a grading machine which comprises a machine frame, a drawbar rotatably mounted with respect to the machine frame and carrying the blade, and drive means actuable to drive the drawbar rotation to vary the transverse grade angle of the blade; the combination of sensing means for developing a signal representing the deviation of the grade angle from a predetermined value, a continuously driven power shaft, clutch means having releasably engageable clutch teeth for positively connecting the shaft to the drive means to actuate the latter, discriminating means responsive to the magnitude of the signal and normally actuable in response to a signal exceeding a first critical value, said discriminating means being shiftable to a desensitized condition in which it is actuable only in response to a signal exceeding a second critical value larger than said first value, means acting to cause clutch engagement in response to actuation of the discriminating means, and desensitizing means acting in response to actuation of the discriminating means to shift the discriminating means to desensitized condition.

38. A control system as defined in claim 37, and in which the desensitizing means is actuable in response to engagement of the clutch means.

References Cited in the file of this patent

UNITED STATES PATENTS

| | | |
|---|---|---|
| 1,038,460 | Tanner | Sept. 10, 1912 |
| 1,144,935 | De Leeuw | June 29, 1915 |
| 1,936,518 | McColm | Nov. 21, 1933 |
| 2,029,455 | Wilson | Feb. 4, 1936 |
| 2,034,141 | Gustafson | Mar. 17, 1936 |
| 2,076,523 | Ballack et al. | Apr. 13, 1937 |
| 2,173,656 | Newell | Sept. 19, 1939 |
| 2,420,932 | Cornelius | May 20, 1947 |
| 2,472,944 | Furer et al. | June 14, 1949 |
| 2,555,034 | Hay | May 29, 1951 |
| 2,635,469 | Summers | Apr. 21, 1953 |
| 2,636,290 | Bell | Apr. 28, 1953 |
| 2,722,125 | Siebengartner et al. | Nov. 1, 1955 |